United States Patent
Lee et al.

(10) Patent No.: US 11,057,643 B2
(45) Date of Patent: Jul. 6, 2021

(54) METHOD AND APPARATUS FOR GENERATING AND ENCODING PROJECTION-BASED FRAME THAT INCLUDES AT LEAST ONE PADDING REGION AND AT LEAST ONE PROJECTION FACE PACKED IN 360-DEGREE VIRTUAL REALITY PROJECTION LAYOUT

(71) Applicant: MEDIATEK INC., Hsin-Chu (TW)

(72) Inventors: Ya-Hsuan Lee, Hsinchu (TW);
Chia-Ying Li, Hsinchu (TW);
Hung-Chih Lin, Hsinchu (TW);
Jian-Liang Lin, Hsinchu (TW);
Shen-Kai Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 86 days.

(21) Appl. No.: 15/917,844

(22) Filed: Mar. 12, 2018

(65) Prior Publication Data

US 2018/0262775 A1  Sep. 13, 2018

Related U.S. Application Data

(60) Provisional application No. 62/470,425, filed on Mar. 13, 2017.

(51) Int. Cl.
*H04N 19/597* (2014.01)
*H04N 19/563* (2014.01)
(Continued)

(52) U.S. Cl.
CPC ....... *H04N 19/597* (2014.11); *H04N 5/23238* (2013.01); *H04N 19/563* (2014.11); *H04N 19/59* (2014.11); *H04N 19/86* (2014.11)

(58) Field of Classification Search
CPC combination set(s) only.
See application file for complete search history.

(56) References Cited

U.S. PATENT DOCUMENTS

| 6,781,598 B1 | 8/2004 | Yamamoto |
| 8,786,675 B2 | 7/2014 | Deering |

(Continued)

FOREIGN PATENT DOCUMENTS

| CN | 101002474 A | 7/2007 |
| CN | 101127911 A | 2/2008 |

(Continued)

OTHER PUBLICATIONS

"International Search Report" dated Jun. 22, 2018 for International application No. PCT/CN2018/081723, International filing date:Apr. 3, 2018.

(Continued)

*Primary Examiner* — Alexander Gee
(74) *Attorney, Agent, or Firm* — Winston Hsu

(57) ABSTRACT

A video processing method includes: receiving an omnidirectional content corresponding to a sphere, obtaining projection faces from the omnidirectional content, and creating a projection-based frame by generating at least one padding region and packing the projection faces and said at least one padding region in a 360 VR projection layout. The projection faces packed in the 360 VR projection layout include a first projection face and a second projection face, where there is an image content discontinuity edge between the first projection face and the second projection face if the first projection face connects with the second projection face. The at least one padding region packed in the 360 VR projection layout includes a first padding region, where the first padding region connects with the first projection face and the second projection face for isolating the first projection face from the second projection face in the 360 VR projection layout.

20 Claims, 14 Drawing Sheets

(51) Int. Cl.
*H04N 19/86* (2014.01)
*H04N 19/59* (2014.01)
*H04N 5/232* (2006.01)

(56) References Cited

U.S. PATENT DOCUMENTS

| | | |
|---|---|---|
| 9,721,393 B1 | 8/2017 | Dunn |
| 2004/0105597 A1 | 6/2004 | Lelescu |
| 2009/0123088 A1 | 5/2009 | Kallay |
| 2014/0152655 A1 | 6/2014 | Johnston |
| 2014/0218354 A1 | 8/2014 | Park |
| 2016/0088282 A1* | 3/2016 | Sadi ............... G03B 35/08 348/38 |
| 2016/0352791 A1 | 12/2016 | Adams |
| 2016/0353146 A1 | 12/2016 | Weaver |
| 2017/0045941 A1 | 2/2017 | Tokubo |
| 2017/0084073 A1 | 3/2017 | Pio |
| 2017/0251204 A1 | 8/2017 | Gupte |
| 2017/0280126 A1 | 9/2017 | Van Der Auwera |
| 2017/0358126 A1* | 12/2017 | Lim ............... H04N 13/243 |
| 2018/0027257 A1 | 1/2018 | Izumi |
| 2018/0167613 A1 | 6/2018 | Hannuksela |
| 2018/0249164 A1* | 8/2018 | Kim ............... H04N 19/174 |
| 2018/0288363 A1 | 10/2018 | Amengual Galdon |
| 2018/0357804 A1 | 12/2018 | Forutanpour |
| 2018/0359487 A1 | 12/2018 | Bang |
| 2019/0005709 A1 | 1/2019 | Kim |
| 2019/0188828 A1 | 6/2019 | Aggarwal |
| 2019/0215532 A1 | 7/2019 | He |
| 2019/0253624 A1 | 8/2019 | Kim |

FOREIGN PATENT DOCUMENTS

| | | |
|---|---|---|
| CN | 104219584 A | 12/2014 |
| CN | 105898254 A | 8/2016 |
| CN | 105915907 A | 8/2016 |
| CN | 205545713 U | 8/2016 |
| CN | 106056531 A | 10/2016 |
| CN | 106162139 A | 11/2016 |
| CN | 205721064 U | 11/2016 |
| CN | 106358033 A | 1/2017 |
| CN | 106686381 A | 5/2017 |
| CN | 106846245 A | 6/2017 |
| CN | 107622474 A | 1/2018 |
| JP | 2000-67227 A | 3/2000 |
| JP | 2007-257100 A | 10/2007 |
| WO | 2004/047426 A2 | 6/2004 |
| WO | 20061016781 A1 | 2/2006 |
| WO | 2016/140082 A1 | 9/2016 |
| WO | 2016/171404 A1 | 10/2016 |
| WO | 20171158236 A2 | 9/2017 |
| WO | 2017/217763 A1 | 12/2017 |
| WO | 2018/064965 A1 | 4/2018 |

OTHER PUBLICATIONS

Ya-Hsuan Lee et al., Title: Method and Apparatus for Processing Projection-Based Frame With At Least One Projection Face Generated Using Non-Uniform Mapping, pending U.S. Appl. No. 15/766,829, filed Apr. 9, 2018.

"International Search Report" dated Nov. 16, 2018 for International application No. PCT/CN2018/100933, International filing dated:Aug. 17, 2018.

"International Search Report" dated Dec. 28, 2018 for International application No. PCT/CN2018/107351, International filing:Sep. 25, 2018.

Jian-Liang Lin et al., Title: Method for Processing Projection-Based Frame That Includes at Least One Projection Face Packed in 360-Degree Virtual Reality Projection Layout, pending U.S. Appl. No. 16/143,410, filed Sep. 26, 2018.

"International Search Report" dated May 31, 2018 for International application No. PCT/CN2018/078785, International filing date:Mar. 13, 2018.

Kashyap Kammachi-Sreedhar et al., AHG8: Nested polygonal chain packing of 360-degree ERP pictures, Joint Video Exploration Team (JVET) of ITU-T SG 16 WP 3 and ISO/IEC JTC 1/SC 29/WG 11, 5th Meeting, Jan. 12-20, 2017, pp. 1-3, JVET-E0090v2, Nokia, Geneva, CH.

Peng Wang et al., AHG 8: A viewport-based pyramid projection for VR360 video streaming, Joint Video Exploration Team (JVET) of ITU-T SG 16 WP 3 and ISO/IEC JTC 1/SC 29/WG 11, 5th Meeting, Jan. 12-20, 2017, pp. 1-4, JVET-E0058, MediaTek Inc., Geneva, CH.

Yan Ye et al., Algorithm descriptions of projection format conversion and video quality metrics in 360Lib, Joint Video Exploration Team (JVET) of ITU-T SG 16 WP 3 and ISO/IEC JTC 1/SC 29/WG 11, 5th Meeting, Jan. 12-20, 2017, pp. 1-22, JVET-E1003, InterDigital Communications, Samsung Electronics, Intel , Geneva, CH.

Thomas Engelhardt et al., Octahedron Environment Maps, http://www.vis.uni-stutt gart.de/engelhts/paper/vmvOctaMaps.pdf, Topics 1-6, Figures 1 and 4, 2008, USA.

K. Kammachi Sreedhar et al., AHG8: Test results for viewport-dependent pyramid, cube map, and equirectangular panorama schemes, Joint Video Exploration Team (JVET) of ITU-T SG 16 WP 3 and ISO/IEC JTC 1/SC 29/WG 11, 4th Meeting: Chengdu, CN, Oct. 15-21, 2016, Document: JVET-D0078, Summary, Section 1.1-1.4, Figures 2-4.

\* cited by examiner

METHOD AND APPARATUS FOR GENERATING AND ENCODING PROJECTION-BASED FRAME THAT INCLUDES AT LEAST ONE PADDING REGION AND AT LEAST ONE PROJECTION FACE PACKED IN 360-DEGREE VIRTUAL REALITY PROJECTION LAYOUT

CROSS REFERENCE TO RELATED APPLICATIONS

This application claims the benefit of U.S. provisional application No. 62/470,425, filed on Mar. 13, 2017 and incorporated herein by reference.

BACKGROUND

The present invention relates to processing omnidirectional image/video content, and more particularly, to a method and an apparatus for generating and encoding a projection-based frame that includes at least one padding region and at least one projection face packed in a 360-degree virtual reality (360 VR) projection layout.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image/video content corresponding to a sphere. With advances in camera rigs and HMDs, the delivery of VR content may soon become the bottleneck due to the high bitrate required for representing such a 360-degree image/video content. When the resolution of the omnidirectional video is 4K or higher, data compression/encoding is critical to bitrate reduction.

In general, the omnidirectional image/video content corresponding to the sphere is transformed into a sequence of images, each of which is a projection-based frame with a 360-degree image/video content represented by one or more projection faces arranged in a 360-degree Virtual Reality (360 VR) projection layout, and then the sequence of the projection-based frames is encoded into a bitstream for transmission. If the employed 360 VR projection layout is not properly designed, it is possible that the projection-based frame is not compact and/or has many image content discontinuity edges that are caused by packing of the projection faces. In addition, the image quality of boundaries and/or image content discontinuity edges of the projection-based frame after compression may be poor.

SUMMARY

One of the objectives of the claimed invention is to provide a method and an apparatus for generating and encoding a projection-based frame that includes at least one padding region and at least one projection face packed in a 360-degree virtual reality (360 VR) projection layout. With a proper padding design of the 360 VR projection layout, the projection-based frame can have better image quality after compression.

According to a first aspect of the present invention, an exemplary video processing method is disclosed. The exemplary video processing method includes: receiving an omnidirectional content corresponding to a sphere; obtaining a plurality of projection faces from the omnidirectional content of the sphere, wherein the omnidirectional content of the sphere is mapped onto the projection faces via a 360-degree Virtual Reality (360 VR) projection; and creating, by a conversion circuit, a projection-based frame by generating at least one padding region and packing the projection faces and said at least one padding region in a 360 VR projection layout, wherein the projection faces packed in the 360 VR projection layout comprise a first projection face and a second projection face, where there is an image content discontinuity edge between one side of the first projection face and one side of the second projection face if said one side of the first projection face connects with said one side of the second projection face; said at least one padding region packed in the 360 VR projection layout comprises a first padding region, where the first padding region connects with said one side of the first projection face and said one side of the second projection face for isolating said one side of the first projection face from said one side of the second projection face in the 360 VR projection layout.

According to a second aspect of the present invention, an exemplary video processing method is disclosed. The exemplary video processing method includes: receiving an omnidirectional content corresponding to a sphere; obtaining at least one projection face from the omnidirectional content of the sphere, wherein the omnidirectional content of the sphere is mapped onto said at least one projection face via a 360-degree Virtual Reality (360 VR) projection; and creating, by a conversion circuit, a projection-based frame by generating at least one padding region and packing said at least one projection face and said at least one padding region in a 360 VR projection layout, wherein said at least one projection face packed in the 360 VR projection layout comprises a first projection face; said at least one padding region packed in the 360 VR projection layout comprises a first padding region; the first padding region connects with the first projection face, and forms at least a portion of one boundary of the 360 VR projection layout.

According to a third aspect of the present invention, an exemplary video processing apparatus is disclosed. The exemplary video processing apparatus includes a conversion circuit and a video encoder. The conversion circuit is arranged to receive an omnidirectional content corresponding to a sphere; obtain a plurality of projection faces from the omnidirectional content of the sphere, wherein the omnidirectional content of the sphere is mapped onto the projection faces via a 360-degree Virtual Reality (360 VR) projection; and create a projection-based frame by generating at least one padding region and packing the projection faces and said at least one padding region in a 360 VR projection layout, wherein the projection faces packed in the 360 VR projection layout comprise a first projection face and a second projection face, where there is an image content discontinuity edge between one side of the first projection face and one side of the second projection face if said one side of the first projection face connects with said one side of the second projection face; said at least one padding region packed in the 360 VR projection layout comprises a first padding region, where the first padding region connects with said one side of the first projection face and said one side of the second projection face for isolating said one side of the first projection face from said one side of the second projection face in the 360 VR projection layout. The video encoder is arranged to encode the projection-based frame with the projection faces and said at least one padding region packed in the 360 VR projection layout to generate a part of a bitstream.

According to a fourth aspect of the present invention, an exemplary video processing apparatus is disclosed. The exemplary video processing apparatus includes a conversion circuit and a video encoder. The conversion circuit is arranged to receive an omnidirectional content corresponding to a sphere; obtain at least one projection face from the omnidirectional content of the sphere, wherein the omnidirectional content of the sphere is mapped onto said at least one projection face via a 360-degree Virtual Reality (360 VR) projection; and create a projection-based frame by generating at least one padding region and packing said at least one projection face and said at least one padding region in a 360 VR projection layout, wherein said at least one projection face packed in the 360 VR projection layout comprises a first projection face; said at least one padding region packed in the 360 VR projection layout comprises a first padding region; the first padding region connects with the first projection face, and forms at least one boundary of the 360 VR projection layout. The video encoder is arranged to encode the projection-based frame with said at least one projection face and said at least one padding region packed in the 360 VR projection layout to generate a part of a bitstream.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
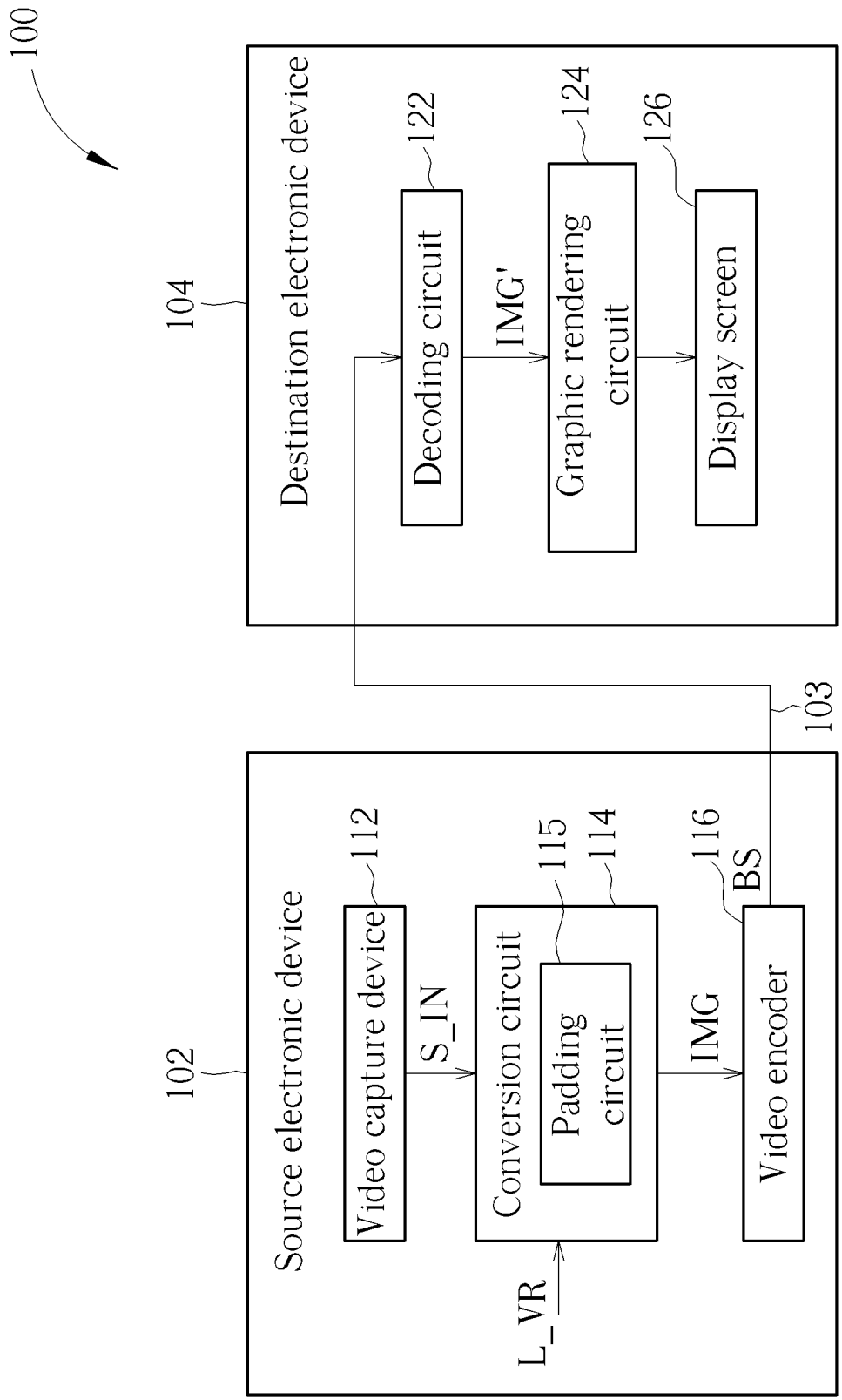
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be a set of cameras used to provide an omnidirectional image/video content (e.g., multiple images that cover the whole surroundings) S_IN corresponding to a sphere. The conversion circuit 114 is coupled between the video capture device 112 and the video encoder 116. The conversion circuit 114 generates a projection-based frame IMG with a 360-degree Virtual Reality (360 VR) projection layout L_VR according to the omnidirectional image/video content S_IN. For example, the projection-based frame IMG may be one frame included in a sequence of projection-based frames generated from the conversion circuit 114. The video encoder 116 is an encoding circuit used to encode/compress the projection-based frames IMG to generate a part of a bitstream BS. Further, the video encoder 116 outputs the bitstream BS to the destination electronic device 104 via a transmission means 103. For example, the sequence of projection-based frames may be encoded into the bitstream BS, and the transmission means 103 may be a wired/wireless communication link or a storage medium.

The destination electronic device 104 may be a head-mounted display (HMD) device. As shown in FIG. 1, the destination electronic device 104 includes a decoding circuit 122, a graphic rendering circuit 124, and a display screen 126. The decoding circuit 122 receives the bitstream BS from the transmission means 103 (e.g., a wired/wireless communication link or a storage medium), and performs a video decoder function for decoding a part of the received bitstream BS to generate a decoded frame IMG'. For example, the decoding circuit 122 generates a sequence of decoded frames by decoding the received bitstream BS, where the decoded frame IMG' is one frame included in the sequence of decoded frames. In this embodiment, the projection-based frame IMG to be encoded by the video encoder 116 at the encoder side has a 360 VR projection format with a projection layout. Hence, after the bitstream BS is decoded by the decoding circuit 122 at the decoder side, the decoded frame IMG' has the same 360 VR projection format and the same projection layout. The graphic rendering circuit 124 is coupled between the decoding circuit 122 and the display screen 126. The graphic rendering circuit 124 renders and displays an output image data on the display screen 126 according to the decoded frame IMG'. For example, a viewport area associated with a portion of the 360-degree image/video content carried by the decoded frame IMG' may be displayed on the display screen 126 via the graphic rendering circuit 124.

As mentioned above, the conversion circuit 114 generates the projection-based frame IMG according to the 360 VR projection layout L_VR and the omnidirectional image/video content S_IN. If the 360 VR projection layout L_VR is a compact projection layout without padding, it is possible that packing of projection faces may result in image content discontinuity edges between adjacent projection faces.

Figure 2:
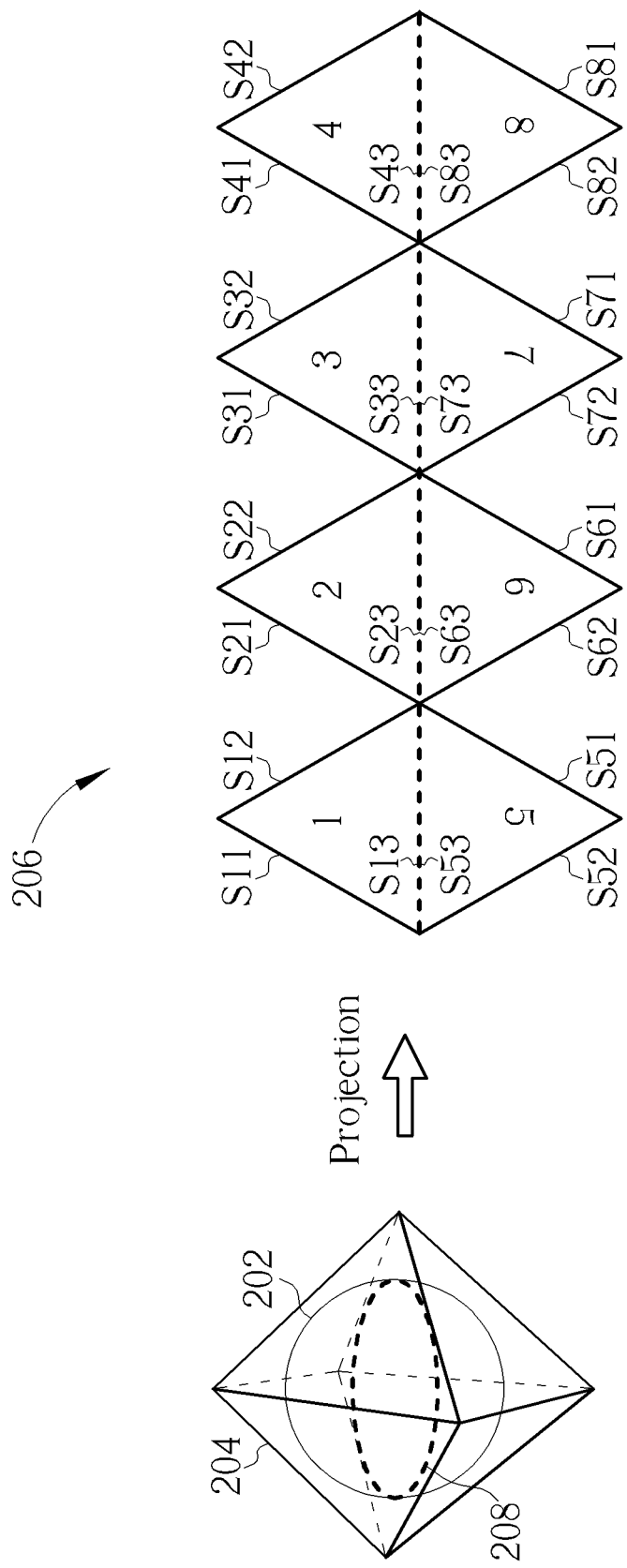
FIG. 2 is a diagram illustrating triangular projection faces of an octahedron projection format that are obtained from an octahedron projection of a sphere according to an unrotated octahedron.

FIG. 2 is a diagram illustrating triangular projection faces of an octahedron projection format that are obtained from an octahedron projection of a sphere according to an unrotated octahedron. An omnidirectional image/video content of a sphere 202 is mapped onto eight triangular projection faces (labeled by reference numbers "1", "2", "3", "4", "5", "6", "7" and "8") of an unrotated octahedron 204. As shown in FIG. 2, the triangular projection faces "1"-"8" are arranged in an octahedron projection layout 206. A shape of each of the triangular projection faces "1"-"8" is an equilateral triangle. For a triangular projection face "K" (K=1-8), this face has three sides, denoted as SK1, SK2, and SK3. The sphere 202 is composed of a top hemisphere (e.g., a northern hemisphere) and a bottom hemisphere (e.g., a southern hemisphere). Due to an octahedron projection based on the unrotated octahedron 204, the triangular projection faces "1", "2", "3", and "4" are all derived from the top hemisphere, the triangular projection faces "5", "6", "7", and "8" are all derived from the bottom hemisphere, and an equator 208 of the sphere 202 is mapped along sides S13, S23, S33, S43, S53, S63, S73 and S83 of the triangular projection faces "1"-"8", as indicated by dotted lines in FIG. 2.

The projection-based frame IMG to be encoded is required to be rectangular. If the octahedron projection layout 206 is directly used for creating the projection-based frame IMG, the projection-based frame IMG is unable to have a compact frame layout due to many dummy areas (e.g., black areas, gray areas, or white areas) filled in the projection-based frame IMG. Thus, there is a need for a compact octahedron projection layout that can avoid using dummy areas (e.g., black areas, gray areas, or white areas).

Figure 3:
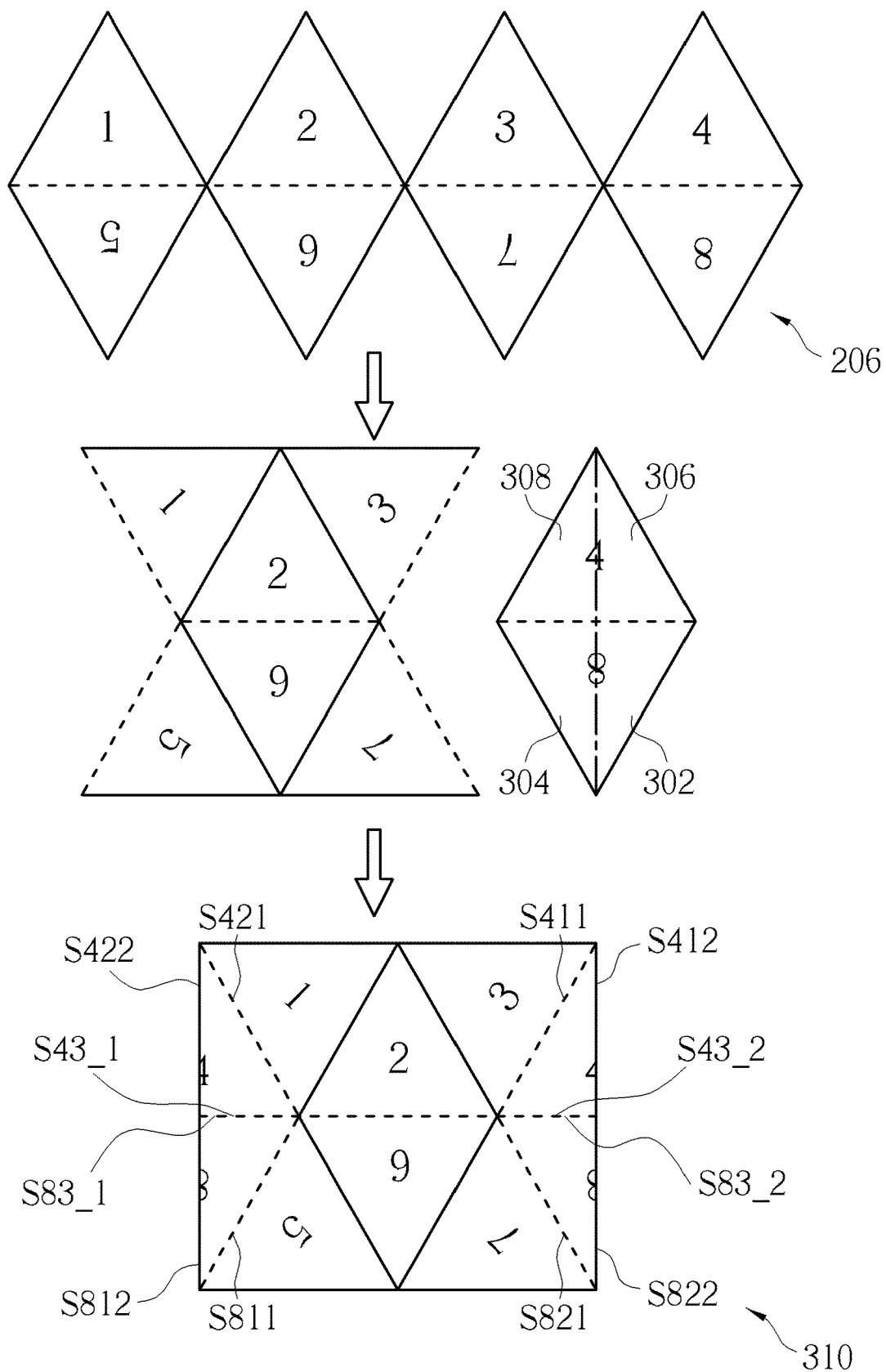
FIG. 3 is a diagram illustrating a first compact octahedron projection layout according to an embodiment of the present invention.

Please refer to FIG. 2 in conjunction with FIG. 3. FIG. 3 is a diagram illustrating a first compact octahedron projection layout according to an embodiment of the present invention. The equator 208 of the sphere 202 is mapped along sides of the triangular projection faces "1"-"8", as indicated by dotted lines in FIG. 3. The compact octahedron projection layout 310 is derived from the octahedron projection layout 206 with triangular projection face rotation and triangular projection face splitting. As shown in the middle part of FIG. 3, the triangular projection face "1" in the octahedron projection layout 206 is rotated by 60° clockwise, the triangular projection face "3" in the octahedron projection layout 206 is rotated by 60° counterclockwise, the triangular projection face "5" in the octahedron projection layout 206 is rotated by 60° counterclockwise, and the triangular projection face "7" in the octahedron projection layout 206 is rotated by 60° clockwise. Hence, the side S21 of the triangular projection face "2" connects with the side S12 of the triangular projection face "1", the side S22 of the triangular projection face "2" connects with the side S31 of the triangular projection face "3", the side S62 of the triangular projection face "6" connects with the side S51 of the triangular projection face "5", and the side S61 of the triangular projection face "6" connects with the side S72 of the triangular projection face "7".

As shown in the middle part of FIG. 3, an image content continuity boundary exists between the side S21 of the triangular projection face "2" and the side S12 of the triangular projection face "1" (i.e., content is continuously represented in the triangular projection faces "1" and "2"), an image content continuity boundary exists between the side S22 of the triangular projection face "2" and the side S31 of the triangular projection face "3" (i.e., content is continuously represented in the triangular projection faces "2" and "3"), an image content continuity boundary exists between the side S23 of the triangular projection face "2" and the side S63 of the triangular projection face "6" (i.e., content is continuously represented in the triangular projection faces "2" and "6"), an image content continuity boundary exists between the side S62 of the triangular projection face "6" and the side S51 of the triangular projection face "5" (i.e., content is continuously represented in the triangular projection faces "5" and "6"), and an image content continuity boundary exists between the side S61 of the triangular projection face "6" and the side S72 of the triangular projection face "7" (i.e., content is continuously represented in the triangular projection faces "6" and "7").

In addition, the triangular projection face "8" in the octahedron projection layout 206 is split into two right-triangle-shaped parts 302 and 304, and the triangular projection face "4" in the octahedron projection layout 206 is split into two right-triangle-shaped parts 306 and 308. As shown in the bottom part of FIG. 3, the right-triangle-shaped part 304 of the triangular projection face "8" and the right-triangle-shaped part 308 of the triangular projection face "4" are connected to the triangular projection faces "7" and "3", respectively; and the right-triangle-shaped part 302 of the triangular projection face "8" and the right-triangle-shaped part 306 of the triangular projection face "4" are relocated and connected to the triangular projection faces "5" and "1", respectively.

The right-triangle-shaped part 302 of the triangular projection face "8" has three sides S811, S812, and S83_1, where the side S811 is the side S81 of the triangular projection face "8", and the side S83_1 is a first part of the side S83 of the triangular projection face "8". The right-triangle-shaped part 304 of the triangular projection face "8" has three sides S821, S822, and S83_2, where the side S821 is the side S82 of the triangular projection face "8", and the side S83_2 is a second part of the side S83 of the triangular projection face "8".

The right-triangle-shaped part 306 of the triangular projection face "4" has three sides S421, S422, and S43_1, where the side S421 is the side S42 of the triangular projection face "4", and the side S43_1 is a first part of the side S43 of the triangular projection face "4". The righttriangle-shaped part 308 of the triangular projection face "4" has three sides S411, S412, and S43_2, where the side S411 is the side S41 of the triangular projection face "4", and the side S43_2 is a second part of the side S43 of the triangular projection face "4".

In accordance with the compact octahedron projection layout 310, the side S821 of the right-triangle-shaped part 304 of the triangular projection face "8" connects with the side S73 of the triangular projection face the side S83_2 of the right-triangle-shaped part 304 of the triangular projection face "8" connects with the side S43_2 of the right-triangle-shaped part 308 of the triangular projection face "4", the side S411 of the right-triangle-shaped part 308 of the triangular projection face "4" connects with the side S33 of the triangular projection face "3", the side S811 of the right-triangle-shaped part 302 of the triangular projection face "8" connects with the side S53 of the triangular projection face "5", the side S83_1 of the right-triangle-shaped part 302 of the triangular projection face "8" connects with the side S43_1 of the right-triangle-shaped part 306 of the triangular projection face "4", and the side S421 of the right-triangle-shaped part 306 of the triangular projection face "4" connects with the side S13 of the triangular projection face "1".

An image content continuity boundary exists between the side S83_2 of the right-triangle-shaped part 304 of the triangular projection face "8" and the side S43_2 of the right-triangle-shaped part 308 of the triangular projection face "4". An image content continuity boundary exists between the side S83_1 of the right-triangle-shaped part 302 of the triangular projection face "8" and the side S43_1 of the right-triangle-shaped part 306 of the triangular projection face "4". That is, content is continuously represented in the triangular projection faces "4" and "8". Further, an image content discontinuity edge exists between the side S821 of the right-triangle-shaped part 304 of the triangular projection face "8" and the side S73 of the triangular projection face "7", an image content discontinuity edge exists between the side S411 of the right-triangle-shaped part 308 of the triangular projection face "4" and the side S33 of the triangular projection face "3", an image content discontinuity edge exists between the side S811 of the right-triangle-shaped part 302 of the triangular projection face "8" and the side S53 of the triangular projection face "5", and an image content discontinuity edge exists between the side S421 of the right-triangle-shaped part 306 of the triangular projection face "4" and the side S13 of the triangular projection face "1".

As shown in the bottom part of FIG. 3, the 360 VR projection layout L_VR set by the compact octahedron projection layout 310 is a rectangle without any dummy areas (e.g., black areas or white areas). In addition, a portion of the 360-degree image/video content is continuously represented in the triangular projection faces "1", "2", "3", "5", "6", "7" with no image content discontinuity. However, some image content discontinuity edges still exist in the compact octahedron projection layout 310, inevitably. Hence, if the 360 VR projection layout L_VR is set by the compact octahedron projection layout 310, the image quality near the image content discontinuity edges after compression may be poor.

When the triangular projection faces "1"-"8" shown in FIG. 2 are rearranged and packed in the compact octahedron projection layout 310, some triangular projection faces have to be split and relocated, thus resulting in image content discontinuity of the equator 208 in the projection-based frame IMG. In general, the top and bottom areas of the sphere 202 usually represent "sky" and "ground", respectively, and moving objects in the surrounding environment are mostly located at the equator 208 of the sphere 202. If the equator 208 represented in the projection-based frame IMG has image content discontinuity, the encoding efficiency and the image quality are dramatically degraded. The encoding efficiency and the image quality can be improved if the equator 208 of the sphere 202 is mapped along middles of the triangular projection faces or any positions other than sides of the triangular projection faces.

Figure 4:
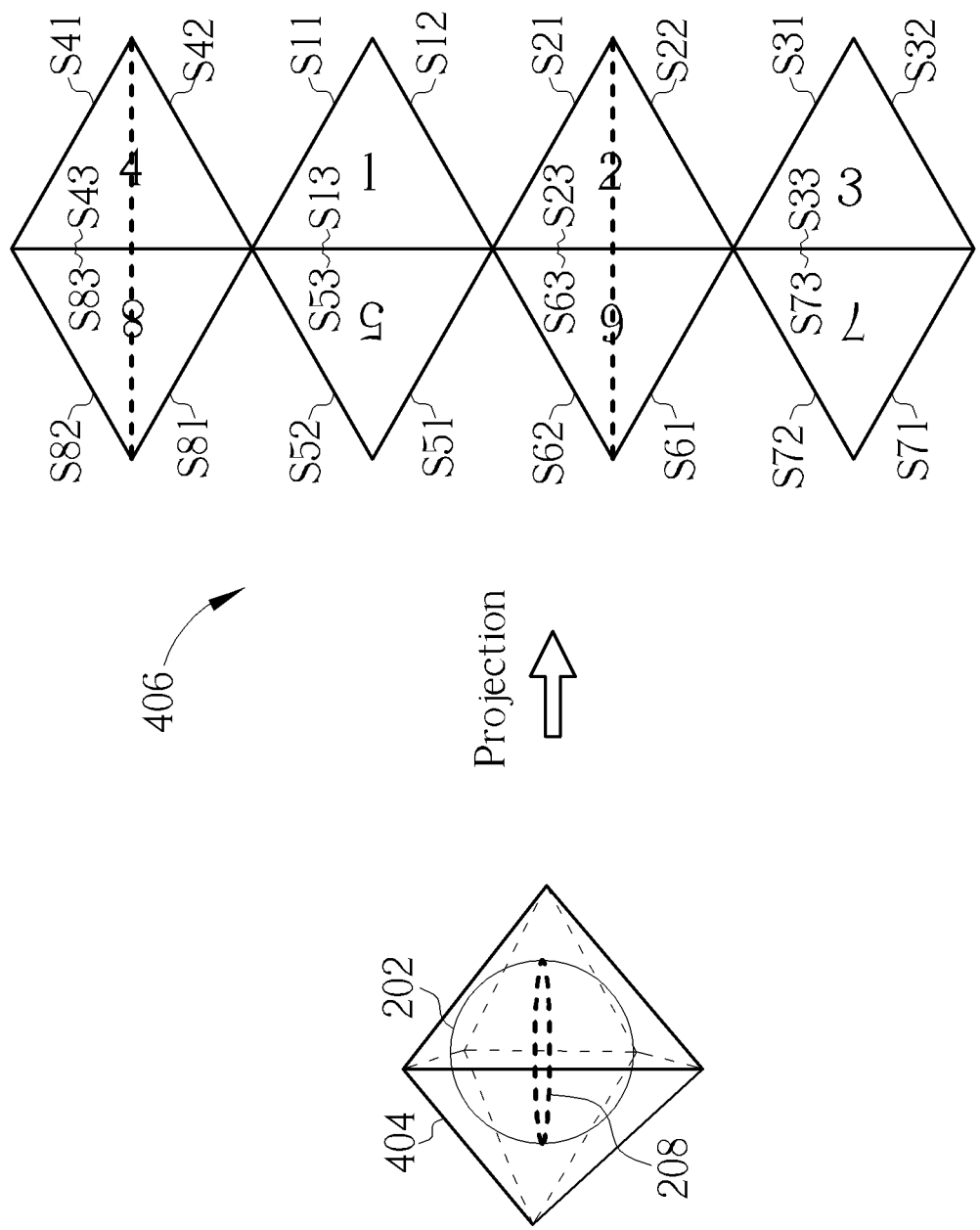
FIG. 4 is a diagram illustrating triangular projection faces of an octahedron projection format that are obtained from an octahedron projection of a sphere according to a rotated octahedron.

FIG. 4 is a diagram illustrating triangular projection faces of an octahedron projection format that are obtained from an octahedron projection of a sphere according to a rotated octahedron. The omnidirectional image/video content of the sphere 202 is mapped onto eight triangular projection faces (labeled by reference numbers "1", "2", "3", "4", "5", "6", "7" and "8") of a rotated octahedron 404. The rotated octahedron 404 shown in FIG. 4 may be obtained by applying 90-degree rotation to the octahedron 204 shown in FIG. 2. As shown in FIG. 4, the triangular projection faces "1"-"8" are packed in an octahedron projection layout 406. A shape of each of the triangular projection faces "1"-"8" is an equilateral triangle. For a triangular projection face "K" (K=1-8), this face has three sides, denoted as SK1, SK2, and SK3. The sphere 202 is composed of a left hemisphere and a right hemisphere. The triangular projection faces "1", "2", "3", and "4" are all derived from the right hemisphere, and the triangular projection faces "5", "6", "7", and "8" are all derived from the left hemisphere. Due to an octahedron projection on the rotated octahedron 404, the equator 208 of the sphere 202 is not mapped along any side of each triangular projection face. In this embodiment, the equator 208 of the sphere 202 is mapped along middles of the triangular projection faces "2", "4", "6", and "8", as indicated by dotted lines in FIG. 4. As mentioned above, the projection-based frame IMG to be encoded is required to be rectangular. Hence, a compact octahedron projection layout should be used by the projection-based frame IMG.

Figure 5:
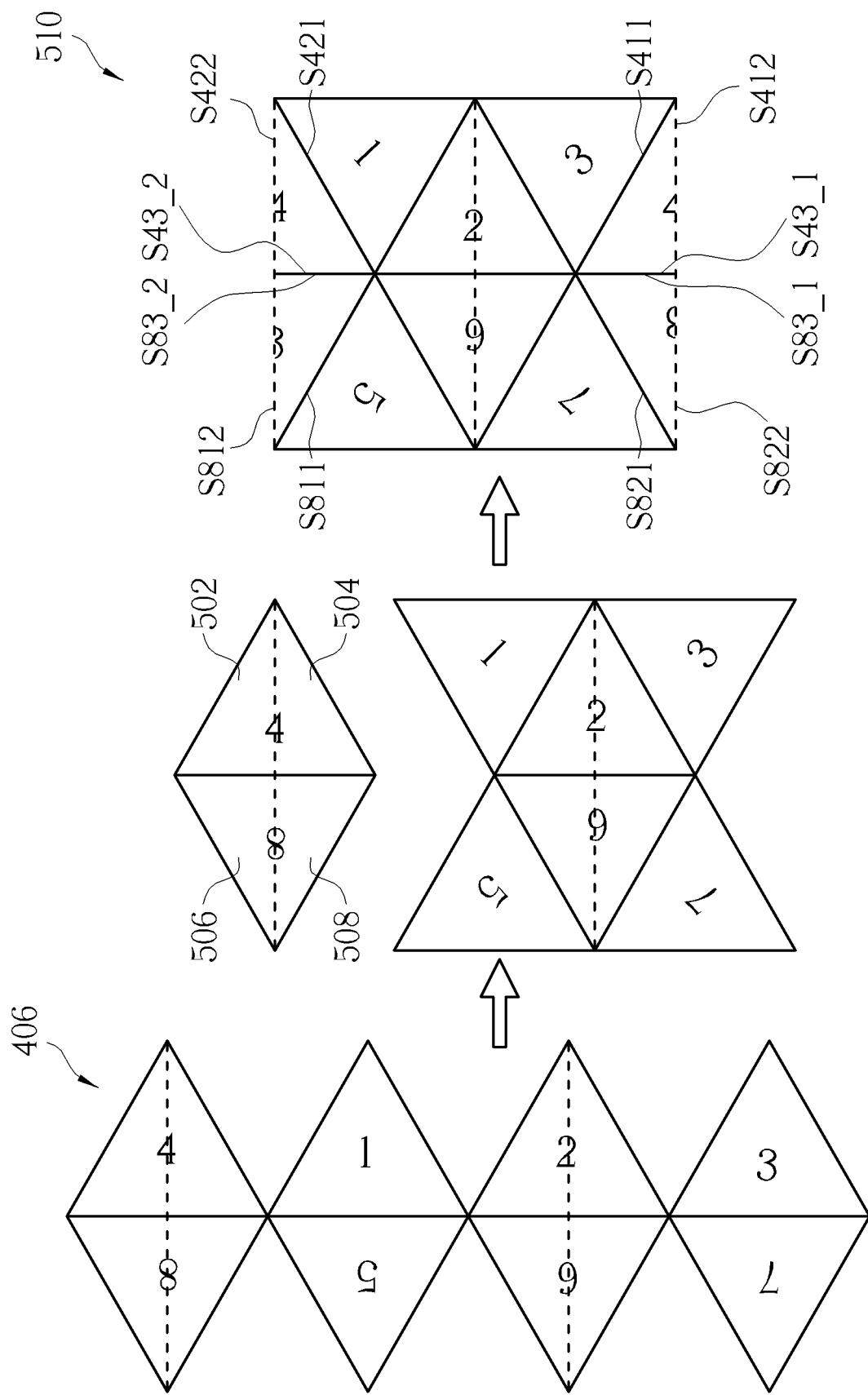
FIG. 5 is a diagram illustrating a second compact octahedron projection layout according to an embodiment of the present invention.

Please refer to FIG. 4 in conjunction with FIG. 5. FIG. 5 is a diagram illustrating a second compact octahedron projection layout according to an embodiment of the present invention. The equator 208 of the sphere 202 is mapped along middles of the triangular projection faces "2", "4", "6", and "8", as indicated by dotted lines in FIG. 5. The compact octahedron projection layout 510 is derived from the octahedron projection layout 406 with triangular projection face rotation and triangular projection face splitting. As shown in the middle part of FIG. 5, the triangular projection face "7" in the octahedron projection layout 406 is rotated by 60° clockwise, the triangular projection face "5" in the octahedron projection layout 406 is rotated by 60° counterclockwise, the triangular projection face "3" in the octahedron projection layout 406 is rotated by 60° counterclockwise, and the triangular projection face "1" in the octahedron projection layout 406 is rotated by 60° clockwise. Hence, the side S72 of the triangular projection face "7" connects with the side S61 of the triangular projection face "6", the side S51 of the triangular projection face "5" connects with the side S62 of the triangular projection face "6", the side S31 of the triangular projection face "3" connects with the side S22 of the triangular projection face "2", and the side S12 of the triangular projection face "1" connects with the side S21 of the triangular projection face "2".

As shown in the middle part of FIG. 5, an image content continuity boundary exists between the side S72 of the triangular projection face "7" and the side S61 of the triangular projection face "6" (i.e., content is continuously represented in the triangular projection faces "6" and "7"), an image content continuity boundary exists between the side S51 of the triangular projection face "5" and the side S62 of the triangular projection face "6" (i.e., content is continuously represented in the triangular projection faces "5" and "6"), an image content continuity boundary exists between the side S31 of the triangular projection face "3" and the side S22 of the triangular projection face "2" (i.e., content is continuously represented in the triangular projection faces "2" and "3"), an image content continuity boundary exists between the side S12 of the triangular projection face "1" and the side S21 of the triangular projection face "2" (i.e., content is continuously represented in the triangular projection faces "1" and "2"), and an image content continuity boundary exists between the side S23 of the triangular projection face "2" and the side S63 of the triangular projection face "6" (i.e., content is continuously represented in the triangular projection faces "2" and "6").

In addition, the triangular projection face "4" in the octahedron projection layout 406 is split into two right-triangle-shaped parts 502 and 504, and the triangular projection face "8" in the octahedron projection layout 406 is split into two right-triangle-shaped parts 506 and 508. As shown in the right part of FIG. 5, the right-triangle-shaped part 504 of the triangular projection face "4" and the right-triangle-shaped part 508 of the triangular projection face "8" are connected to the triangular projection faces "1" and "5", respectively; and the right-triangle-shaped part 502 of the triangular projection face "4" and the right-triangle-shaped part 506 of the triangular projection face "8" are relocated and connected to the triangular projection faces "3" and "7", respectively.

The right-triangle-shaped part 502 of the triangular projection face "4" has three sides S411, S412, and S43_1, where the side S411 is the side S41 of the triangular projection face "4", and the side S43_1 is a first part of the side S43 of the triangular projection face "4". The right-triangle-shaped part 504 of the triangular projection face "4" has three sides S421, S422, and S43_2, where the side S421 is the side S42 of the triangular projection face "4", and the side S43_2 is a second part of the side S43 of the triangular projection face "4".

The right-triangle-shaped part 506 of the triangular projection face "8" has three sides S821, S822, and S83_1, where the side S821 is the side S82 of the triangular projection face "8", and the side S83_1 is a first part of the side S83 of the triangular projection face "8". The right-triangle-shaped part 508 of the triangular projection face "8" has three sides S811, S812, and S83_2, where the side S811 is the side S81 of the triangular projection face "8", and the side S83_2 is a second part of the side S83 of the triangular projection face "8".

In accordance with the compact octahedron projection layout 510, the side S421 of the right-triangle-shaped part 504 of the triangular projection face "4" connects with the side S13 of the triangular projection face "1", the side S43_2 of the right-triangle-shaped part 504 of the triangular projection face "4" connects with the side S83_2 of the right-triangle-shaped part 508 of the triangular projection face "8", the side S811 of the right-triangle-shaped part 508 of the triangular projection face "8" connects with the side S53 of the triangular projection face "5", the side S411 of the right-triangle-shaped part 502 of the triangular projection face "4" connects with the side S33 of the triangular projection face "3", the side S43_1 of the right-triangle-shaped part 502 of the triangular projection face "4" connects with the side S83_1 of the right-triangle-shaped part 506 of the triangular projection face "8", and the side S821 of the right-triangle-shaped part 506 of the triangular projection face "8" connects with the side S73 of the triangular projection face "7".

An image content continuity boundary exists between the side S43_2 of the right-triangle-shaped part 504 of the triangular projection face "4" and the side S83_2 of the right-triangle-shaped part 508 of the triangular projection face "8". An image content continuity boundary exists between the side S43_1 of the right-triangle-shaped part 502 of the triangular projection face "4" and the side S83_1 of the right-triangle-shaped part 506 of the triangular projection face "8". That is, content is continuously represented in the triangular projection faces "4" and "8". Further, an image content discontinuity edge exists between the side S421 of the right-triangle-shaped part 504 of the triangular projection face "4" and the side S13 of the triangular projection face "1", an image content discontinuity edge exists between the side S811 of the right-triangle-shaped part 508 of the triangular projection face "8" and the side S53 of the triangular projection face "5", an image content discontinuity edge exists between the side S411 of the right-triangle-shaped part 502 of the triangular projection face "4" and the side S33 of the triangular projection face "3", and an image content discontinuity edge exists between the side S821 of the right-triangle-shaped part 506 of the triangular projection face "8" and the side S73 of the triangular projection face "7".

In the right part of FIG. 5, the 360 VR projection layout L_VR arranged by a shape of the compact octahedron projection layout 510 is a rectangle without any dummy areas (e.g., black areas, gray areas, or white areas). In addition, a portion of the 360-degree image/video content is continuously represented in the triangular projection faces "1", "2", "3", "5", "6", "7" with no image content discontinuity. Moreover, the equator 208 represented by the triangular projection faces "2", "4", "6", and "8" in the projection-based image IMG (which uses the compact octahedron projection layout 510) has no image content discontinuity resulting from triangular projection face splitting. However, some image content discontinuity edges still exist in the compact octahedron projection layout 510, inevitably. Hence, if the 360 VR projection layout L_VR is set by the compact octahedron projection layout 510, the image quality near the image content discontinuity edges after compression may be poor.

To address the aforementioned image quality degradation issue, the present invention proposes an innovative 360 VR projection layout design with padding that is capable of improving the image quality at edges of projection face(s) after compression. For example, the 360 VR projection layout L_VR may be set by a compact cubemap layout with padding or a compact octahedron layout with padding. Specifically, the conversion circuit 114 receives an omnidirectional image/video content of the sphere 202 from the video capture device 112, and obtains a plurality of projection faces from the omnidirectional image/video content of the sphere 202, wherein the omnidirectional image/video content of the sphere 202 is mapped onto the projection faces via a selected 360 VR projection (e.g., cubemap projection or octahedron projection). As shown in FIG. 1, the conversion circuit 114 has a padding circuit 115 that is arranged to generate at least one padding region. The conversion circuit 114 creates the projection-based frame IMG by packing the projection faces and at least one padding region in the 360 VR projection layout L_VR (e.g., a compact cubemap layout with padding or a compact octahedron layout with padding).

For example, the projection faces packed in the 360 VR projection layout L_VR include a first projection face and a second projection face, where there is an image content discontinuity edge between a first side of the first projection face and a first side of the second projection face if the first side of the first projection face connects with the first side of the second projection face. The at least one padding region packed in the 360 VR projection layout L_VR includes a first padding region, where the first padding region connects with the first side of the first projection face and the first side of the second projection face for isolating the first side of the first projection face from the first side of the second projection face in the 360 VR projection layout L_VR. The first padding region is intentionally inserted to provide more information for compression procedure. In this way, the image quality of the first side of the first projection face and the first side of the second projection face after compression can be improved.

Figure 6:
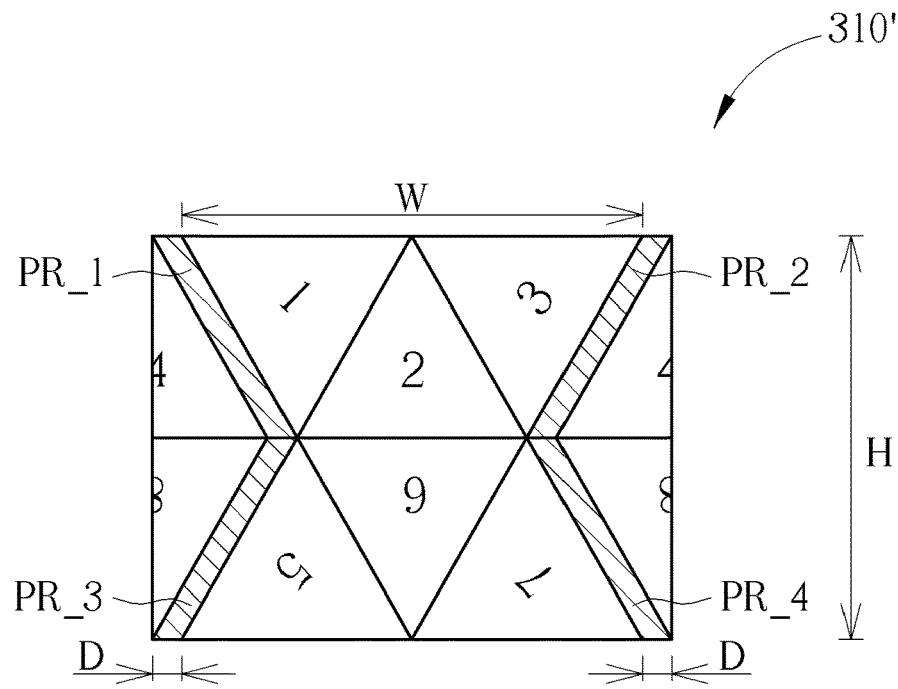
FIG. 6 is a diagram illustrating a first compact octahedron projection layout with padding according to an embodiment of the present invention.

FIG. 6 is a diagram illustrating a first compact octahedron projection layout with padding according to an embodiment of the present invention. The 360 VR projection layout L_VR employed by the conversion circuit 114 may be set by the compact octahedron projection layout 310' shown in FIG. 6. The compact octahedron projection layout 310' may be derived from the compact octahedron projection layout 310 shown in FIG. 3. Regarding the compact octahedron projection layout 310 shown in FIG. 3, an image content discontinuity edge exists between the side S821 of the right-triangle-shaped part 304 of the triangular projection face "8" and the side S73 of the triangular projection face "7", an image content discontinuity edge exists between the side S411 of the right-triangle-shaped part 308 of the triangular projection face "4" and the side S33 of the triangular projection face "3", an image content discontinuity edge exists between the side S811 of the right-triangle-shaped part 302 of the triangular projection face "8" and the side S53 of the triangular projection face "5", and an image content discontinuity edge exists between the side S421 of the right-triangle-shaped part 306 of the triangular projection face "4" and the side S13 of the triangular projection face "1". As shown in FIG. 6, a first padding region PR_1 is inserted to connect with the side S421 of the right-triangle-shaped part 306 of the triangular projection face "4" (which is also the side S42 of the projection face "4") and the side S13 of the projection face "1", a second padding region PR_2 is inserted to connect with the side S411 of the right-triangle-shaped part 308 of the triangular projection face "4" (which is also the side S41 of the projection face "4") and the side S33 of the projection face "3", a third padding region PR_3 is inserted to connect with the side S811 of the right-triangle-shaped part 302 of the triangular projection face "8" (which is also the side S81 of the projection face "8") and the side S53 of the projection face "5", and a fourth padding region PR_4 is inserted to connect with the side S821 of the right-triangle-shaped part 304 of the triangular projection face "8" (which is also the side S82 of the projection face "8") and the side S73 of the projection face "7". Supposing that the width of each padding region is D and the compact octahedron projection layout 310 shown in FIG. 3 has width W and height H, the compact octahedron projection layout 310' shown in FIG. 6 has width W+2D and height H. For example, the width of each padding region D may be 16 pixels.

Figure 7:
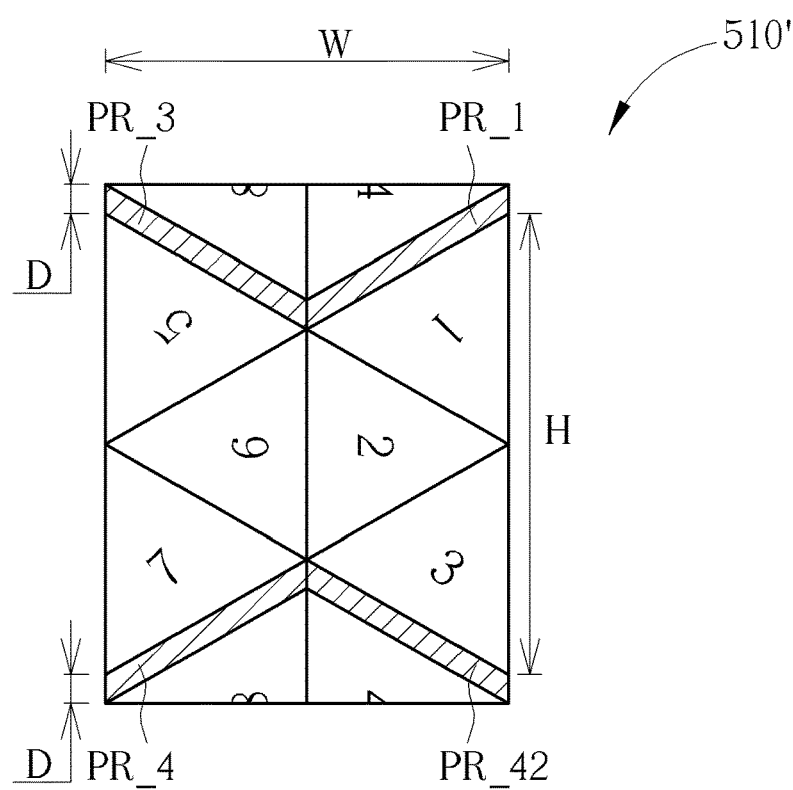
FIG. 7 is a diagram illustrating a second compact octahedron projection layout with padding according to an embodiment of the present invention.

FIG. 7 is a diagram illustrating a second compact octahedron projection layout with padding according to an embodiment of the present invention. The 360 VR projection layout L_VR employed by the conversion circuit 114 may be set by the compact octahedron projection layout 510' shown in FIG. 7. The compact octahedron projection layout 510' may be derived from the compact octahedron projection layout 510 shown in FIG. 5. Regarding the compact octahedron projection layout 510 shown in FIG. 5, an image content discontinuity edge exists between the side S821 of the right-triangle-shaped part 506 of the triangular projection face "8" and the side S73 of the triangular projection face "7", an image content discontinuity edge exists between the side S411 of the right-triangle-shaped part 502 of the triangular projection face "4" and the side S33 of the triangular projection face "3", an image content discontinuity edge exists between the side S811 of the right-triangle-shaped part 508 of the triangular projection face "8" and the side S53 of the triangular projection face "5", and an image content discontinuity edge exists between the side S421 of the right-triangle-shaped part 504 of the triangular projection face "4" and the side S13 of the triangular projection face "1". As shown in FIG. 7, a first padding region PR_1 is inserted to connect with the side S421 of the right-triangle-shaped part 504 of the triangular projection face "4" (which is also the side S42 of the projection face "4") and the side S13 of the projection face "1", a second padding region PR_2 is inserted to connect with the side S411 of the right-triangle-shaped part 502 of the triangular projection face "4" (which is also the side S41 of the projection face "4") and the side S33 of the projection face "3", a third padding region PR_3 is inserted to connect with the side S811 of the right-triangle-shaped part 508 of the triangular projection face "8" (which is also the side S81 of the projection face "8") and the side S53 of the projection face "5", and a fourth padding region PR_4 is inserted to connect with the side S821 of the right-triangle-shaped part 506 of the triangular projection face "8" (which is also the side S82 of the projection face "8") and the side S73 of the projection face "7". Supposing that the height of each padding region is D and the compact octahedron projection layout 510 shown in FIG. 5 has width W and height H, the compact octahedron projection layout 510' shown in FIG. 7 has width W and height H+2D. For example, the height of each padding region D may be 16 pixels.

In one exemplary padding implementation, the padding circuit 115 sets pixel values of pixels included in a padding region by interpolation that is based on pixel values of pixels included in adjacent projection faces connected to the padding region. Regarding each of the compact octahedron projection layout 310' shown in FIG. 6 and the compact octahedron projection layout 510' shown in FIG. 7, pixel values of pixels included in the first padding region PR_1 are acquired by interpolation that is based on pixel values of pixels included in the adjacent projection faces "1" and "4", pixel values of pixels included in the second padding region PR_2 are acquired by interpolation that is based on pixel values of pixels included in the adjacent projection faces "3" and "4", pixel values of pixels included in the third padding region PR_3 are acquired by interpolation that is based on pixel values of pixels included in the adjacent projection faces "3" and "5", and pixel values of pixels included in the fourth padding region PR_4 are acquired by interpolation that is based on pixel values of pixels included in the adjacent projection faces "7" and "8".

Figure 8:
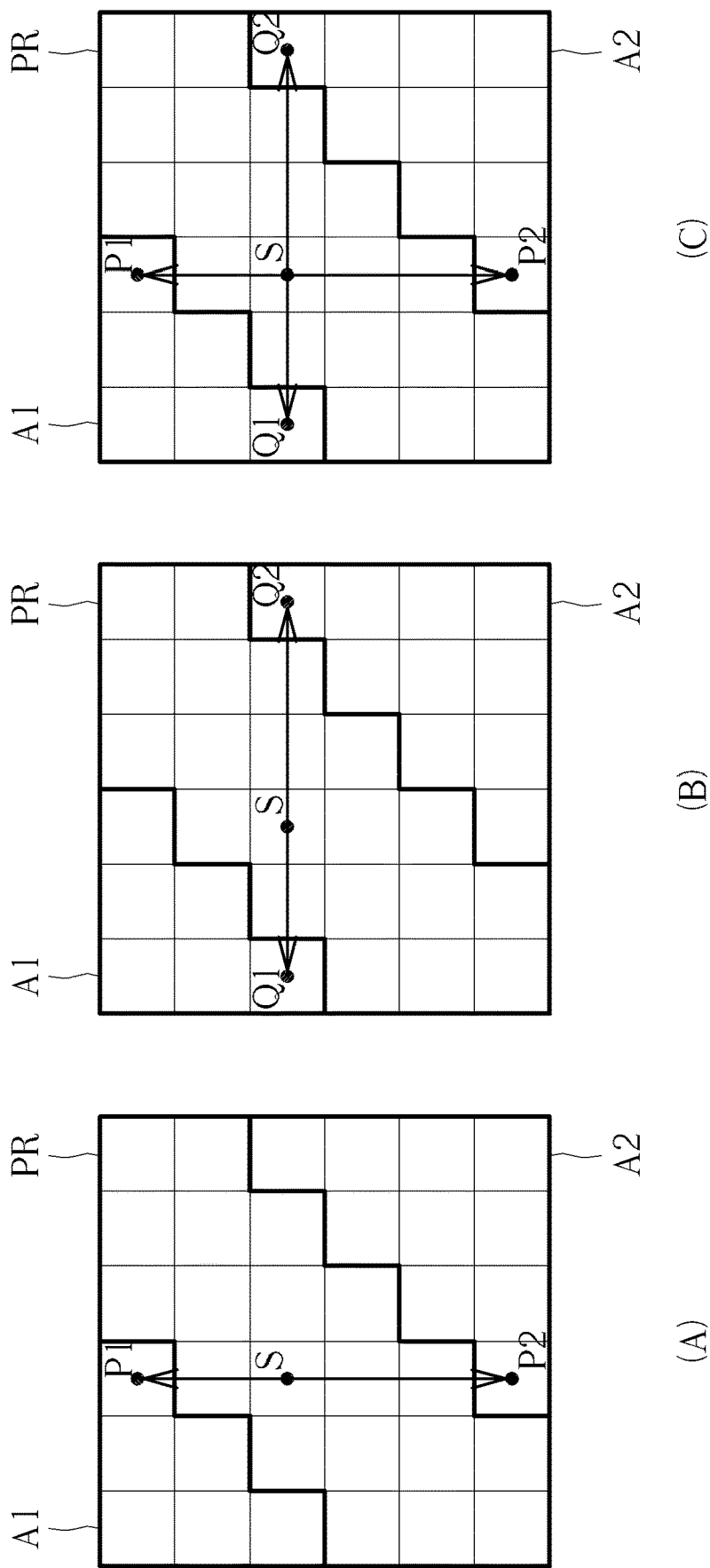
FIG. 8 is a diagram illustrating examples of interpolation performed by a padding circuit shown in FIG. 1.

The employed interpolation may be nearest neighbor interpolation, linear interpolation, bilinear interpolation, or other suitable interpolation algorithm. The sample points used by the employed interpolation may be obtained from a single direction or different directions. FIG. 8 is a diagram illustrating examples of interpolation performed by the padding circuit 115 shown in FIG. 1. A padding region PR is required to be inserted between adjacent projection faces A1 and A2 that are obtained from a selected 360 VR projection of a sphere, where an image content discontinuity edge exists between the adjacent projection faces A1 and A2 if the projection face A1 connects with the projection face A2. As shown in the sub-diagram (A) of FIG. 8, interpolation is performed upon sample points (i.e., pixels) P1 and P2 obtained from the adjacent projection faces A1 and A2 in the vertical direction. Hence, an interpolated sample point (i.e., interpolated pixel) S is determined according to sample values of the sample points P1 and P2, a distance between the sample point P1 and the interpolated sample point S, and a distance between the sample point P2 and the interpolated sample point S.

As shown in the sub-diagram (B) of FIG. 8, interpolation is performed upon sample points (i.e., pixels) Q1 and Q2 obtained from the adjacent projection faces A1 and A2 in the horizontal direction. Hence, an interpolated sample point (i.e., interpolated pixel) S is determined according to sample values of the sample points Q1 and Q2, a distance between the sample point Q1 and the interpolated sample point S, and a distance between the sample point Q2 and the interpolated sample point S.

As shown in the sub-diagram (C) of FIG. 8, interpolation is performed upon sample points (i.e., pixels) P1 and P2 obtained from the adjacent projection faces A1 and A2 in the vertical direction and sample points (i.e., pixels) Q1 and Q2 obtained from the adjacent projection faces A1 and A2 in the horizontal direction. Hence, an interpolated sample point (i.e., interpolated pixel) S is determined according to sample values of the sample points P1, P2, Q1, and Q2, a distance between the sample point P1 and the interpolated sample point S, a distance between the sample point P2 and the interpolated sample point S, a distance between the sample point Q1 and the interpolated sample point S, and a distance between the sample point Q2 and the interpolated sample point S.

Figure 9:
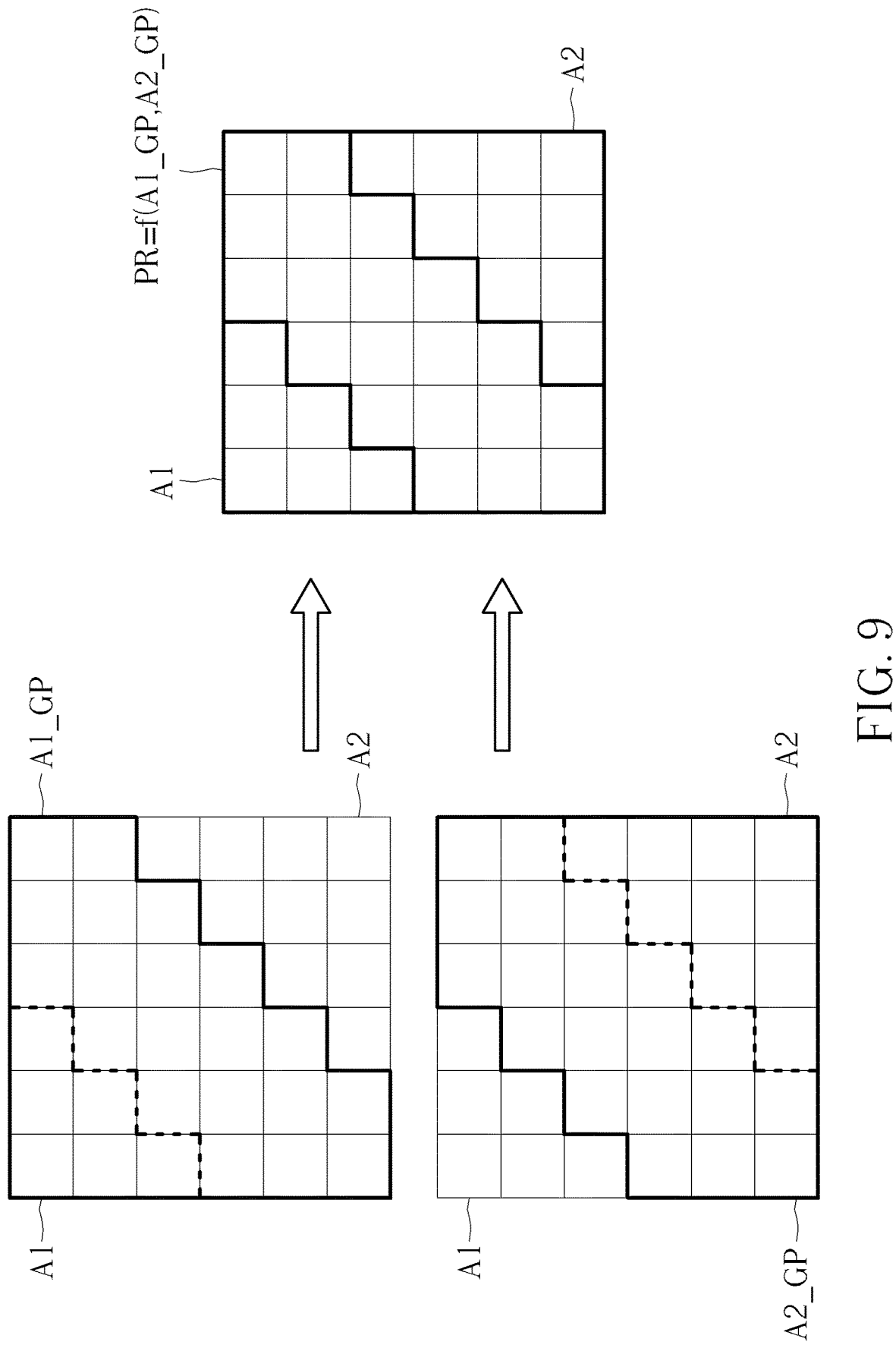
FIG. 9 is a diagram illustrating an example of geometry padding performed by the padding circuit shown in FIG. 1.

In another exemplary padding implementation, the padding circuit 115 applies first geometry padding to one of the adjacent projection faces to determine first pixel values of pixels included in a padding region, applies second geometry padding to the other of the adjacent projection faces to determine second pixel values of the pixels included in the padding region, and sets pixel values of the pixels included in the padding region by blending the first pixel values derived from the first geometry padding and the second pixel values derived from the second geometry padding. FIG. 9 is a diagram illustrating an example of geometry padding performed by the padding circuit 115 shown in FIG. 1. A padding region PR is required to be inserted between adjacent projection faces A1 and A2 that are obtained via a selected 360 VR projection of a sphere, where an image content discontinuity edge exists between the adjacent projection faces A1 and A2 if the projection face A1 connects with the projection face A2. The first geometry padding applied to the projection face A1 determines a geometry mapping region A1_GP, where the geometry mapping region A1_GP is obtained from mapping the content of a region on a sphere (e.g., sphere 202 shown in FIG. 2/FIG. 4) onto the padding region PR, wherein the region on the sphere is adjacent to a region from which the projection face A1 is obtained. Hence, there is an image content continuity boundary between the projection face A1 and the geometry mapping region A1_GP extended from the projection face A1 (i.e., content is continuously represented in the projection face A1 and the geometry mapping region A1_GP).

The second geometry padding applied to the projection face A2 determines another geometry mapping region A2_GP, where the geometry mapping result A2_GP is obtained from mapping the content of a region on a sphere (e.g., sphere 202 shown in FIG. 2/FIG. 4) onto the padding region PR, wherein the region on the sphere is adjacent to a region from which the projection face A2 is obtained. Hence, there is an image content continuity boundary between the projection face A2 and the geometry mapping region A2_GP extended from the projection face A2 (i.e., content is continuously represented in the projection face A2 and the geometry mapping region A2_GP).

After the geometry mapping regions A1_GP and A2_GP associated with the same padding region PR are obtained, the padding circuit 115 blends the geometry mapping regions A1_GP and A2_GP to determine pixel values of pixels included in the padding region PR. That is, PR=f (A1_GP, A2_GP), where f( ) is a blending function. For example, the blending function f( ) may be an average function. Regarding each pixel in the padding region PR, a pixel value of the pixel in the padding region PR is set by an average of a first pixel value of the pixel in the geometry mapping region A1_GP and a second pixel value of the pixel in the geometry mapping region A2_GP.

In yet another exemplary padding implementation, the padding circuit 115 sets pixel values of pixels included in a padding region by duplicating pixel values of pixels included in adjacent projection faces that are obtained from a selected 360 VR projection of a sphere. For example, boundary pixels at a side of the projection face A1 are duplicated to create padding pixels extended from the side of the projection face A1, and boundary pixels at a side of the projection face A2 are duplicated to create padding pixels extended from the side of the projection face A2. In other words, a first part of the padding region PR includes padding pixels each being a duplicate of one boundary pixel of the projection face A1, and a second part of the padding region PR includes padding pixels each being a duplicate of one boundary pixel of the projection face A2.

With the help of one padding region inserted between a first projection face and a second projection face which have an image content discontinuity edge between a first side of the first projection face and a first side of the second projection face if the first side of the first projection face connects with the first side of the second projection face, the image quality of the first side of the first projection face after compression and the image quality of the first side of the second projection face after compression can be improved. The projection faces included in the decoded frame IMG' generated by the decoding circuit 122 can have better image quality. As mentioned above, the graphic rendering circuit 124 renders and displays an output image data on the display screen 126 according to the decoded frame IMG'. Since the padding region(s) in the decoded frame IMG' are additionally added and may not be displayable, the padding region(s) in the decoded frame IMG' may be discarded/ignored by the graphic rendering circuit 124 after the decoded frame IMG' is generated from the decoding circuit 122.

As shown in FIG. 6 and FIG. 7, padding is added to compact octahedron projection layouts for image quality improvement of compression at image content discontinuity edges. However, these are for illustrative purposes only, and are not meant to be limitations of the present invention. In practice, padding can be added to other 360 VR projection layouts for image quality improvement of compression at image content discontinuity edges. These alternative projection designs with padding all fall within the scope of the present invention.

Figure 10:
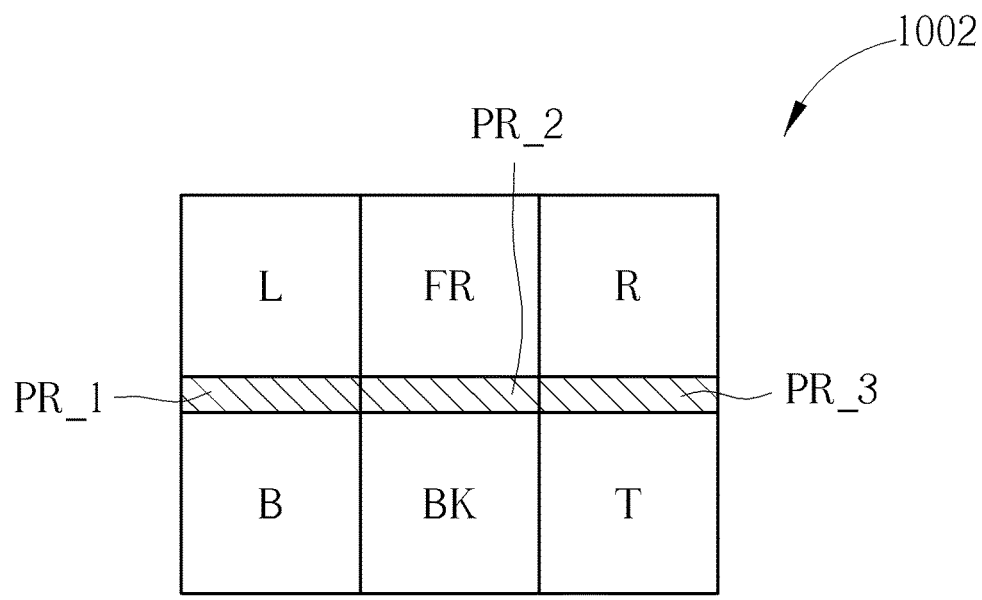
FIG. 10 is a diagram illustrating a compact cubemap projection layout with padding according to an embodiment of the present invention.

FIG. 10 is a diagram illustrating a compact cubemap projection layout with padding according to an embodiment of the present invention. The omnidirectional image/video content of a sphere is mapped onto six square projection faces via a cubemap projection, where the square projection faces include a left projection face labeled by "L", a front projection face labeled by "FR", a right projection face labeled by "R", a top projection face labeled by "T", a back projection face labeled by "BK", and a bottom projection face labeled by "B". An image content discontinuity edge exists between the left projection face "L" and the bottom projection face "B" if the bottom side of the left projection face "L" connects with the top side of the bottom projection face "B" in a compact cubemap projection layout without padding. An image content discontinuity edge exists between the front projection face FR and the back projection face BK if the bottom side of the front projection face FR connects with the top side of the back projection face BK in the compact cubemap projection layout without padding. An image content discontinuity edge exists between the right projection face R and the top projection face T if the bottom side of the right projection face R connects with the top side of the top projection face T in the compact cubemap projection layout without padding. In accordance with the compact cubemap projection layout 1002 shown in FIG. 10, a first padding region PR_1 is inserted between the left projection face L and the top projection face T, a second padding region PR_2 is inserted between the front projection face FR and the back projection face BK, and a third padding region PR_3 is inserted between the right projection face R and the bottom projection face B. Each of the padding regions PR_1-PR_3 may be generated by using one of the aforementioned interpolation manner, geometry padding manner, and duplication manner.

For example, the duplication manner used by the proposed padding technique may spread boundary pixels of a projection face. Hence, a first part of a padding region inserted between a first projection face and a second projection face includes padding pixels each being a duplicate of one boundary pixel of the first projection face, and a second part of the padding region inserted between the first projection face and the second projection face includes padding pixels each being a duplicate of one boundary pixel of the second projection face.

For another example, the duplication manner used by the proposed padding technique may set pixel values of pixels included in the padding region by duplicating pixel values of pixels that are included in the first projection face and the second projection face but do not connect with the padding region inserted between the first projection face and the second projection face. In a case where the duplication manner used by the proposed padding technique obtains a duplicate of a partial region in a projection face. A first part of the padding region inserted between the first projection face and the second projection face is a duplicate of a partial region of the first projection face, and a second part of the padding region inserted between the first projection face and the second projection face is a duplicate of a partial region of the second projection face, where none of the partial region of the first projection face and the partial region of the second projection face connects with the padding region inserted between the first projection face and the second projection face.

For yet another example, the duplication manner used by the proposed padding technique may set pixel values of pixels included in the padding region inserted between the first projection face and the second projection face by duplicating pixel values of pixels included in at least one projection face distinct from the first projection face and the second projection face. Taking the compact cubemap projection layout 1002 shown in FIG. 10 for example, the first padding region PR_1 inserted between the left projection face L and the bottom projection face B may be set by duplicating pixels (e.g., pixels of a partial region) in at least one projection face (e.g., FR, BK, R, and/or T) that is not any of the left projection face L and the bottom projection face B, the second padding region PR_2 inserted between the front projection face FR and the back projection face BK may be set by duplicating pixels (e.g., pixels of a partial region) in at least one projection face (e.g., L, B, R, and/or T) that is not any of the front projection face FR and the back projection face BK, and/or the third padding region PR_3 inserted between the right projection face R and the top projection face T may be set by duplicating pixels (e.g., pixels of a partial region) in at least one projection face (e.g., L, B, FR, and/or BK) that is not any of the right projection face R and the top projection face T.

Figure 11:
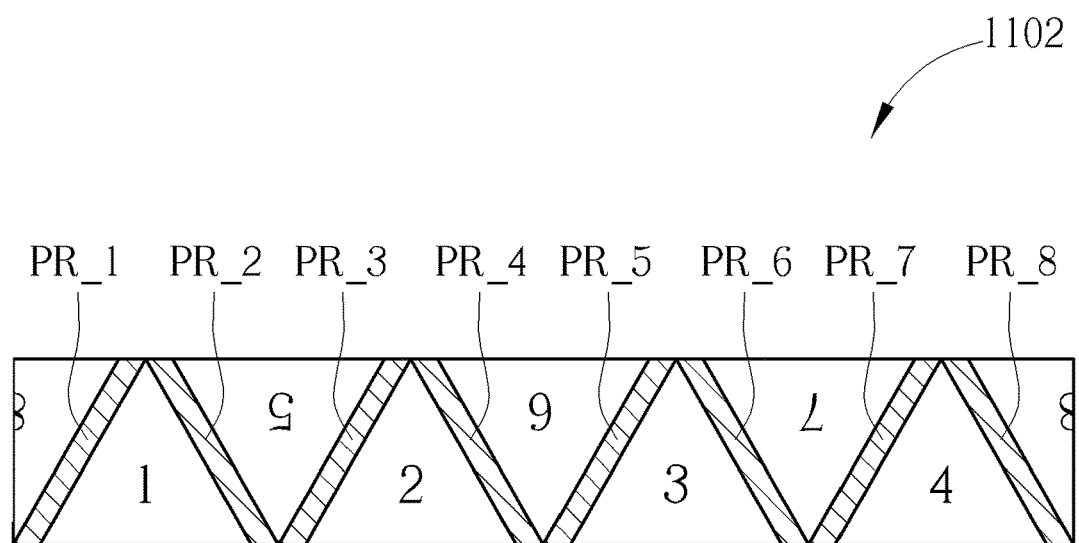
FIG. 11 is a diagram illustrating a third compact octahedron projection layout with padding according to an embodiment of the present invention.

FIG. 11 is a diagram illustrating a third compact octahedron projection layout with padding according to an embodiment of the present invention. The omnidirectional image/video content of a sphere is mapped onto eight triangular projection faces (labeled by reference numbers "1", "2", "3", "4", "5", "6", "7" and "8") via an octahedron projection. The triangular projection face "8" is split into two right-triangle-shaped parts. An image content discontinuity edge exists between one right-triangle-shaped part of the triangular projection face "8" and the triangular projection face "1" if one side of the right-triangle-shaped part connects with one side of the triangular projection face "1" in a compact octahedron projection layout without padding. An image content discontinuity edge exists between the triangular projection faces "1" and "5" if another side of the projection face "1" connects with one side of the triangular projection face "5" in the compact octahedron projection layout without padding. An image content discontinuity edge exists between the triangular projection faces "5" and "2" if another side of the triangular projection face "5" connects with one side of the triangular projection face "2" in the compact octahedron projection layout without padding. An image content discontinuity edge exists between the triangular projection faces "2" and "6" if another side of the triangular projection face "2" connects with one side of the triangular projection face "6" in the compact octahedron projection layout without padding. An image content discontinuity edge exists between the triangular projection faces "6" and "3" if another side of the projection face "6" connects with one side of the triangular projection face "3" in the compact octahedron projection layout without padding. An image content discontinuity edge exists between the triangular projection faces "3" and "7" if another side of the triangular projection face "3" connects with one side of the triangular projection face "7" in the compact octahedron projection layout without padding. An image content discontinuity edge exists between the triangular projection faces "7" and "4" if another side of the projection face "7" connects with one side of the triangular projection face "4" in the compact octahedron projection layout without padding. An image content discontinuity edge exists between the other right-triangle-shaped part of the triangular projection face "8" and the triangular projection face "4" if one side of the right-triangle-shaped part connects with another side of the triangular projection face "4" in the compact octahedron projection layout without padding.

In accordance with the compact octahedron projection layout 1102 shown in FIG. 11, a first padding region PR_1 is inserted between the triangular projection face "1" and one right-triangle-shaped part of the triangular projection face "8", a second padding region PR_2 is inserted between the triangular projection faces "1" and "5", a third padding region PR_3 is inserted between the triangular projection faces "5" and "2", a fourth padding region PR_4 is inserted between the triangular projection faces "2" and "6", a fifth padding region PR_5 is inserted between the triangular projection faces "6" and "3", a sixth padding region PR_6 is inserted between the triangular projection faces "3" and "7", a seventh padding region PR_7 is inserted between the triangular projection faces "7" and "4", and an eighth padding region PR_8 is inserted between the triangular projection face "4" and the other right-triangle-shaped part of the triangular projection face "8". Each of the padding regions PR_1-PR_8 may be generated by using one of the aforementioned interpolation manner, geometry padding manner, and duplication manner.

In addition to the image quality of image content discontinuity edges after compression, the image quality of layout boundaries after compression can be improved by the proposed padding technique. For example, when the omnidirectional image/video content of a sphere is mapped via an equirectangular projection (ERP) or an equal-area projection (EAP), only a single projection face is generated and arranged in an ERP/EAP layout. If a viewing angle of a viewport is 180 degrees, a decoded partial region located at the left boundary of the ERP/EAP layout and a decoded partial region located at the right boundary of the ERP/EAP layout are selected and combined to form a viewport area to be displayed. Since blocks at the left boundary and blocks at the right boundary of the typical ERP/EAP layout are encoded independently, it is possible that the viewport area has artifacts along an edge resulting from combination of the decoded partial region located at the left boundary of the ERP/EAP layout and the decoded partial region located at the right boundary of the ERP/EAP layout. To address this issue, the present invention further proposes adding padding regions to layout boundaries to provide more information for compression process.

Figure 12:
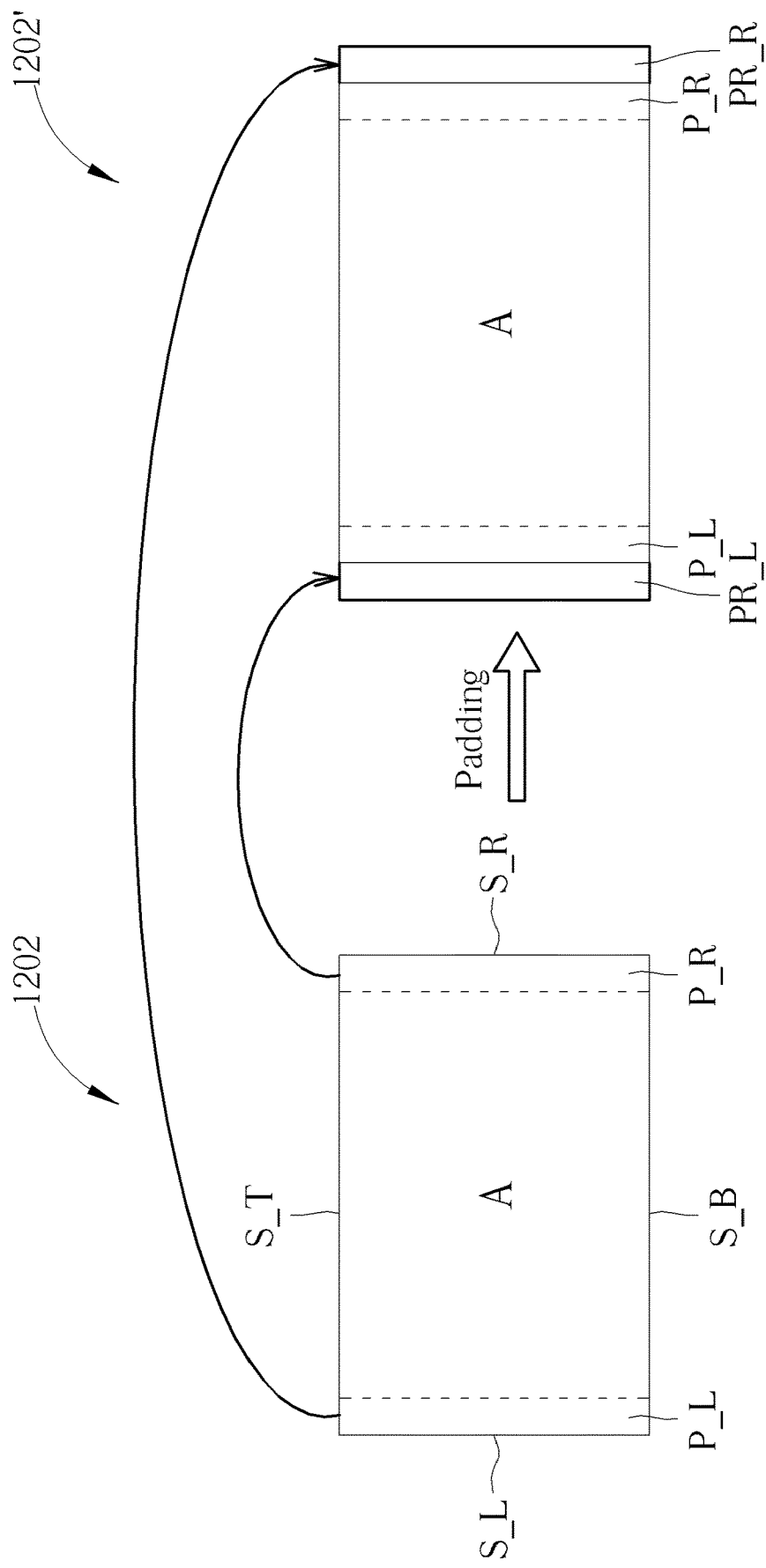
FIG. 12 is a diagram illustrating a first ERP/EAP layout with padding according to an embodiment of the present invention.

FIG. 12 is a diagram illustrating a first ERP/EAP layout with padding according to an embodiment of the present invention. A single projection face A with a top side S_T, a bottom side S_B, a left side S_L and a right side S_R is arranged in an ERP/EAP layout 1202 without padding. The top side S_T, bottom side S_B, left side S_L and right side S_R are four boundaries of the ERP/EAP layout 1202. In addition, the projection face A in the ERP/EAP layout 1202 has a first partial region P_L and a second partial region P_R, where the first partial region P_L includes boundary pixels at the left side S_L, and the second partial region P_R includes boundary pixels at the right side S_R. The 360 VR projection layout L_VR employed by the conversion circuit 114 may be set by the ERP/EAP layout 1202' shown in FIG. 12. The ERP/EAP layout 1202' may be derived from the ERP/EAP layout 1202. The projection face A is obtained via equirectangular projection/equal-area projection of a sphere. The projection face A, a first padding region PR_L and a second padding region PR_R are packed in the ERP/EAP layout 1202'. As shown in FIG. 12, the first padding region PR_L connects with the left side S_L of the projection face A, and forms a left boundary of the ERP/EAP layout 1202', and the second padding region PR_R connects with the right side S_R of the projection face A, and forms a right boundary of the ERP/EAP layout 1202'. For example, the width of the first padding region PR_L may be 8 pixels, and the width of the second padding region PR_R may be 8 pixels. Since left side S_L and right side S_R of the projection face A are opposite sides, the first padding region PR_L does not connect with the right side S_R of the projection face A, and the second padding region PR_R does not connect with the left side S_L of the projection face A.

In this embodiment, the first padding region PR_L is a duplicate of the second partial region P_R of the projection face A, and the second padding region PR_R is a duplicate of the first partial region P_L of the projection face A. Hence, pixels of the first padding region PR_L include boundary pixels at the right side S_R of the projection face A, but do not include boundary pixels at the left side S_L of the projection face A; and pixels of the second padding region PR_R include boundary pixels at the left side S_L of the projection face A, but do not include boundary pixels at the right side S_R of the projection face A. Due to inherent characteristics of the equirectangular projection/equal-area projection, there is an image content continuity boundary between the first padding region PR_L and the projection face A packed in the ERP/EAP layout 1202' (i.e., content is continuously represented in the projection face A and the first padding region PR_L), and there is an image content continuity boundary between the second padding region PR_R and the projection face A packed in the ERP/EAP layout 1202' (i.e., content is continuously represented in the projection face A and the second padding region PR_R).

In addition to padding regions that are added to a left side and a right side of a projection face obtained via equirectangular projection/equal-area projection, padding regions may be added to a top side and a bottom side of the projection face to provide more information for compression process.

Figure 13:
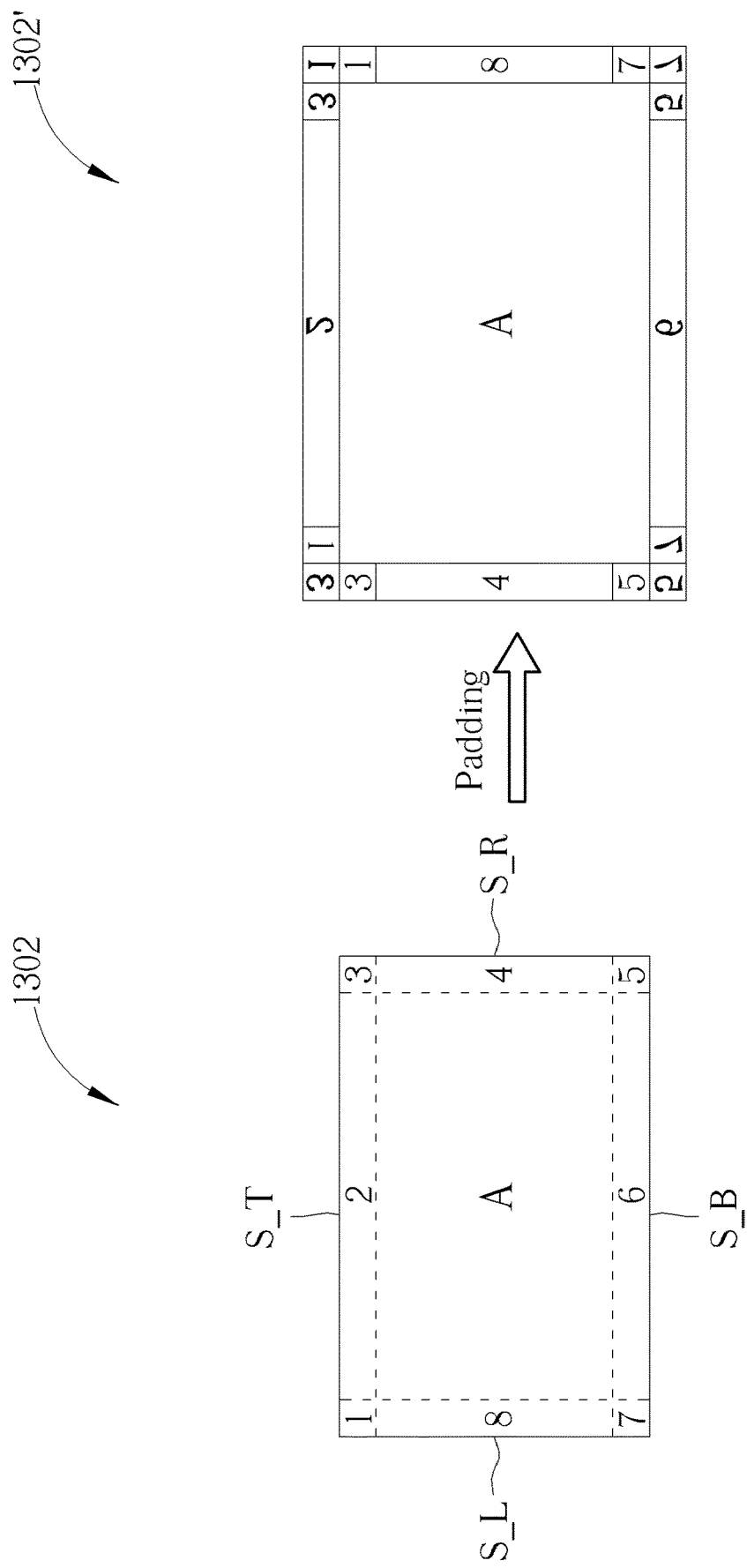
FIG. 13 is a diagram illustrating a second ERP/EAP layout with padding according to an embodiment of the present invention.

FIG. 13 is a diagram illustrating a second ERP/EAP layout with padding according to an embodiment of the present invention. A single projection face A with a top side S_T, a bottom side S_B, a left side S_L and a right side S_R is arranged in an ERP/EAP layout 1302 without padding. The top side S_T, bottom side S_B, left side S_L and right side S_R are four boundaries of the ERP/EAP layout 1302. In addition, the projection face A in the ERP/EAP layout 1302 has a plurality of image areas (labeled by reference numbers "1", "2", "3", "4", "5", "6", "7", and "8"). The image areas "1"-"3" form one partial region, and include boundary pixels at the top side S_T. The image areas "3"-"5" form one partial region, and include boundary pixels at the right side S_R. The image areas "5"-"7" form one partial region, and include boundary pixels at the bottom side S_B. The image areas "1", "8" and "7" form one partial region, and include boundary pixels at the left side S_L.

The 360 VR projection layout L_VR employed by the conversion circuit 114 may be set by the ERP/EAP layout 1302' shown in FIG. 13. The ERP/EAP layout 1302' may be derived from the ERP/EAP layout 1302. The projection face A is obtained via equirectangular projection/equal-area projection of a sphere. As shown in FIG. 13, a first padding region connected with the left side S_L of the projection face A is generated by duplicating the image areas "3"-"5" of the projection face A, a second padding region connected with the right side S_R of the projection face A is generated by duplicating the image areas "1", "8" and "7" of the projection face A, a third padding region connected with the top side S_T of the projection face A is generated by duplicating the image areas "1"-"3" of the projection face A to obtain a duplicated partial region and then flipping the duplicated partial region, and a fourth padding region connected with the bottom side S_B of the projection face A is generated by duplicating the image areas "5"-"7" of the projection face A to obtain a duplicated partial region and then flipping the duplicated partial region.

To make a shape of the ERP/EAP layout 1302' become a rectangle, a top-left corner padding region is generated by duplicating the image area "3" to obtain a duplicated padding region and then flipping the duplicated padding region, a top-right corner padding region is generated by duplicating the image area "1" to obtain a duplicated padding region and then flipping the duplicated padding region, a bottom-left corner padding region is generated by duplicating the image area "5" to obtain a duplicated padding region and then flipping the duplicated padding region, and a bottom-right corner padding region is generated by duplicating the image area "7" to obtain a duplicated padding region and then flipping the duplicated padding region.

Due to inherent characteristics of the equirectangular projection/equal-area projection, an image content continuity boundary exists between the top-left corner padding region and the first padding region, an image content continuity boundary exists between the top-left corner padding region and the third padding region, an image content continuity boundary exists between the top-right corner padding region and the second padding region, an image content continuity boundary exists between the top-right corner padding region and the third padding region, an image content continuity boundary exists between the bottom-left corner padding region and the first padding region, an image content continuity boundary exists between the bottom-left corner padding region and the fourth padding region, an image content continuity boundary exists between the bottom-right corner padding region and the second padding region, and an image content continuity boundary exists between the bottom-right corner padding region and the fourth padding region.

As shown in FIG. 13, the first padding region connected with the left side S_L of the projection face A forms a part of a left boundary of the ERP/EAP layout 1302', the second padding region connected with the right side S_R of the projection face A forms a part of a right boundary of the ERP/EAP layout 1302', the third padding region connected with the top side S_T of the projection face A forms a part of a top boundary of the ERP/EAP layout 1302', and the fourth padding region connected with the bottom side S_B of the projection face A forms a part of a bottom boundary of the ERP/EAP layout 1302'. Due to inherent characteristics of the equirectangular projection/equal-area projection, there is an image content continuity boundary between the first padding region and the projection face A packed in the ERP/EAP layout 1302' (i.e., content is continuously represented in the first padding region and the projection face A), there is an image content continuity boundary between the second padding region and the projection face A packed in the ERP/EAP layout 1302' (i.e., content is continuously represented in the second padding region and the projection face A), there is an image content continuity boundary between the third padding region and the projection face A packed in the ERP/EAP layout 1302' (i.e., content is continuously represented in the third padding region and the projection face A), and there is an image content continuity boundary between the fourth padding region and the projection face A packed in the ERP/EAP layout 1302' (i.e., content is continuously represented in the fourth padding region and the projection face A).

Figure 14:
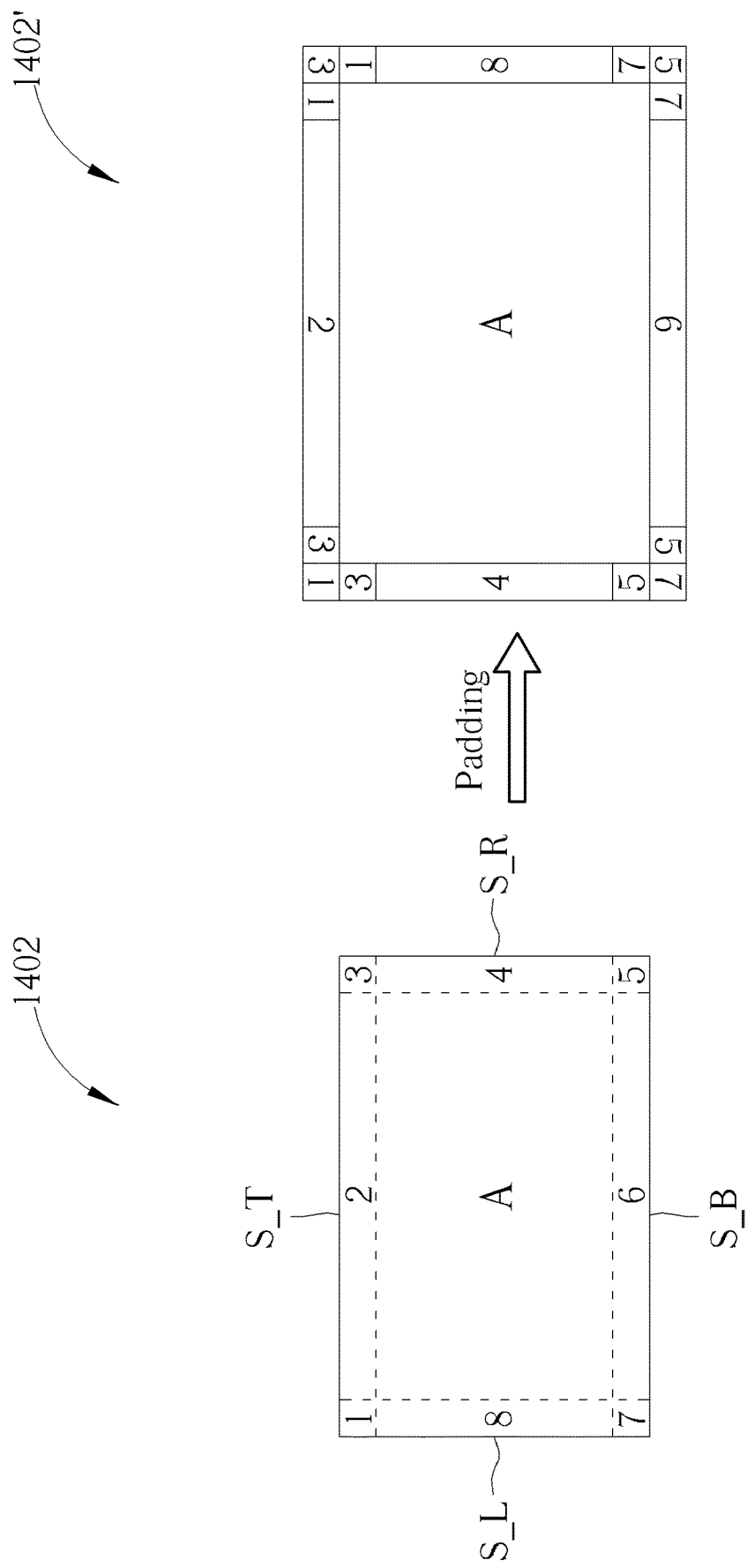
FIG. 14 is a diagram illustrating a third ERP/EAP layout with padding according to an embodiment of the present invention.

FIG. 14 is a diagram illustrating a third ERP/EAP layout with padding according to an embodiment of the present invention. A single projection face A with a top side S_T, a bottom side S_B, a left side S_L and a right side S_R is arranged in an ERP/EAP layout 1402 without padding. The top side S_T, bottom side S_B, left side S_L and right side S_R are four boundaries of the ERP/EAP layout 1402. In addition, the projection face A in the ERP/EAP layout 1402 has a plurality of image areas (labeled by reference numbers "1", "2", "3", "4", "5", "6", "7", and "8"). The image areas "1"-"3" form one partial region, and include boundary pixels at the top side S_T. The image areas "3"-"5" form one partial region, and include boundary pixels at the right side S_R. The image areas "5"-"7" form one partial region, and include boundary pixels at the bottom side S_B. The image areas "7"-"8" and "1" form one partial region, and include boundary pixels at the left side S_L.

The 360 VR projection layout L_VR employed by the conversion circuit 114 may be set by the ERP/EAP layout 1402' shown in FIG. 14. The ERP/EAP layout 1402' may be derived from the typical ERP/EAP layout 1402. The projection face A is obtained via equirectangular projection/equal-area projection of a sphere. As shown in FIG. 14, a first padding region connected with the left side S_L of the projection face A is generated by duplicating the image areas "3"-"5" of the projection face A, a second padding region connected with the right side S_R of the projection face A is generated by duplicating the image areas "1", "8" and "7" of the projection face A, a third padding region connected with the top side S_T of the projection face A is generated by duplicating the image areas "1"-"3" of the projection face A to obtain a duplicated partial region and then rotating the duplicated partial region by 180°, and a fourth padding region connected with the bottom side S_B of the projection face A is generated by duplicating the image areas "5"-"7" of the projection face A to obtain a duplicated partial region and then rotating the duplicated partial region by 180°.

To make a shape of the ERP/EAP layout 1402' become a rectangle, a top-left corner padding region is generated by duplicating the image area "1" to obtain a duplicated padding region and then rotating the duplicated padding region by 180°, a top-right corner padding region is generated by duplicating the image area "3" to obtain a duplicated padding region and then rotating the duplicated padding region by 180°, bottom-left corner padding region is generated by duplicating the image area "7" to obtain a duplicated padding region and then rotating the duplicated padding region by 180°, and a bottom-right corner padding region is generated by duplicating the image area "5" to obtain a duplicated padding region and then rotating the duplicated padding region by 180°.

Due to inherent characteristics of the equirectangular projection/equal-area projection, an image content continuity boundary exists between the top-left corner padding region and the first padding region, an image content continuity boundary exists between the top-left corner padding region and the third padding region, an image content continuity boundary exists between the top-right corner padding region and the second padding region, an image content continuity boundary exists between the top-right corner padding region and the third padding region, an image content continuity boundary exists between the bottom-left corner padding region and the first padding region, an image content continuity boundary exists between the bottom-left corner padding region and the fourth padding region, an image content continuity boundary exists between the bottom-right corner padding region and the second padding region, and an image content continuity boundary exists between the bottom-right corner padding region and the fourth padding region.

As shown in FIG. 14, the first padding region connected with the left side S_L of the projection face A forms a part of a left boundary of the ERP/EAP layout 1402', the second padding region connected with the right side S_R of the projection face A forms a part of a right boundary of the ERP/EAP layout 1402', the third padding region connected with the top side S_T of the projection face A forms a part of a top boundary of the ERP/EAP layout 1402', and the fourth padding region connected with the bottom side S_B of the projection face A forms a part of a bottom boundary of the ERP/EAP layout 1402'. Due to inherent characteristics of the equirectangular projection/equal-area projection, there is an image content continuity boundary between the first padding region and the projection face A packed in the ERP/EAP layout 1402' (i.e., content is continuously represented in the first padding region and the projection face A), there is an image content continuity boundary between the second padding region and the projection face A packed in the ERP/EAP layout 1402' (i.e., content is continuously represented in the second padding region and the projection face A), there is an image content continuity boundary between the third padding region and the projection face A packed in the ERP/EAP layout 1402' (i.e., content is continuously represented in the third padding region and the projection face A), and there is an image content continuity boundary between the fourth padding region and the projection face A packed in the ERP/EAP layout 1402' (i.e., content is continuously represented in the fourth padding region and the projection face A).

As shown in FIGS. 12-14, padding is added to ERP/EAP layouts for image quality improvement of compression at layout boundaries. However, these are for illustrative purposes only, and are not meant to be limitations of the present invention. In practice, padding can be added to other 360 VR projection layouts for image quality improvement of compression at layout boundaries. These alternative projection designs with padding all fall within the scope of the present invention.

Figure 15:
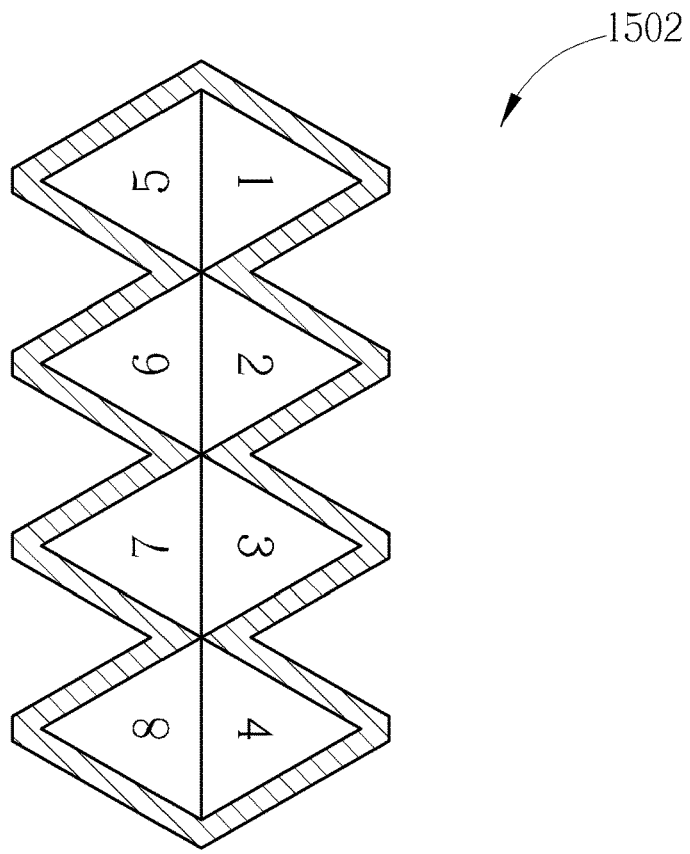
FIG. 15 is a diagram illustrating an octahedron projection layout with padding according to an embodiment of the present invention.
Figure 16:
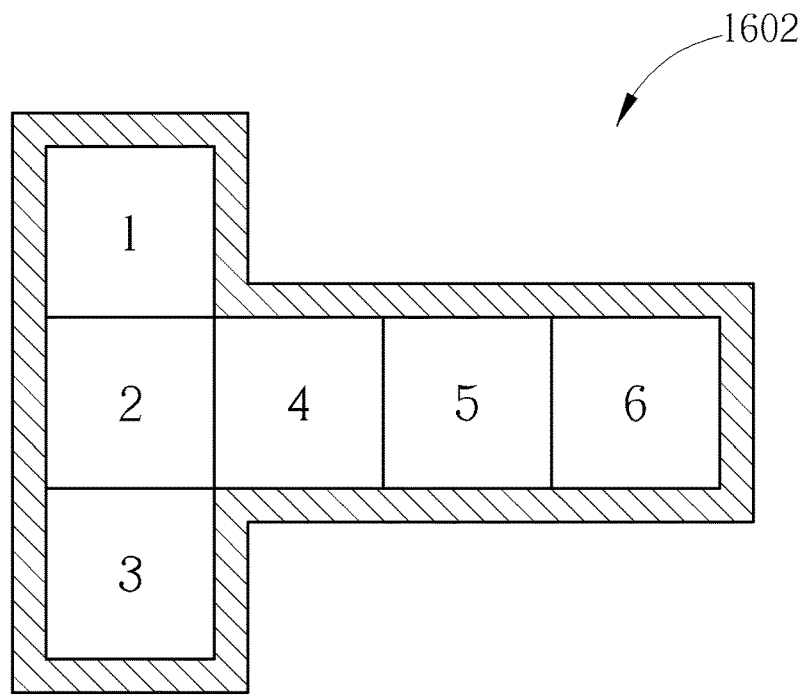
FIG. 16 is a diagram illustrating a cubemap projection layout with padding according to an embodiment of the present invention.
Figure 17:
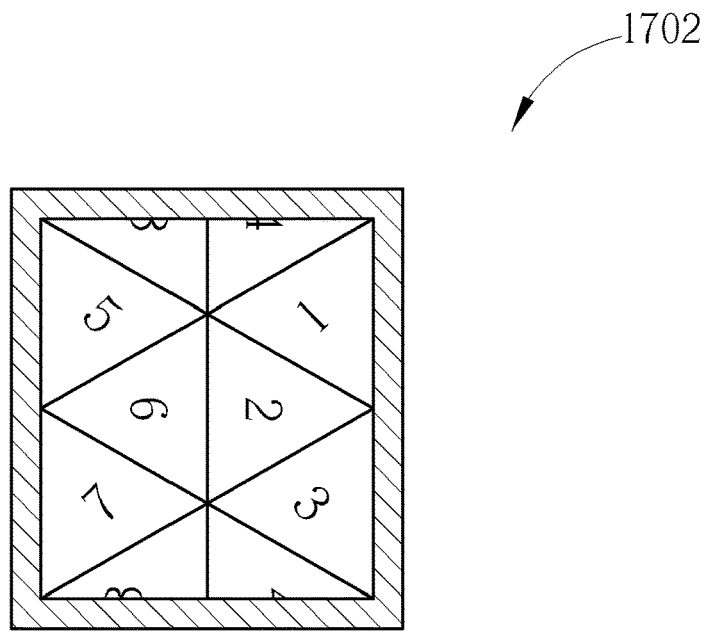
FIG. 17 is a diagram illustrating a fourth compact octahedron projection layout with padding according to an embodiment of the present invention.
Figure 18:
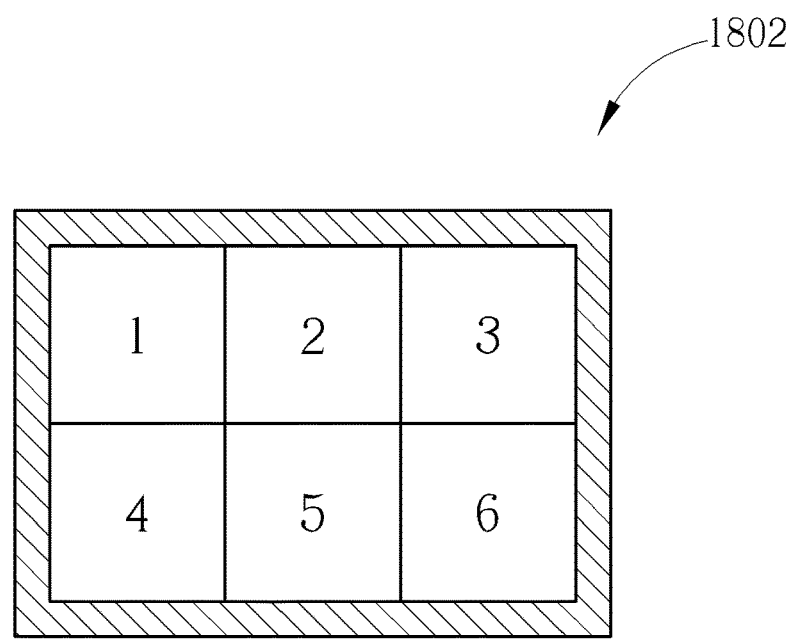
FIG. 18 is a diagram illustrating a compact cubemap projection layout with padding according to an embodiment of the present invention.

FIG. 15 is a diagram illustrating an octahedron projection layout with padding according to an embodiment of the present invention. FIG. 16 is a diagram illustrating a cubemap projection layout with padding according to an embodiment of the present invention. FIG. 17 is a diagram illustrating a fourth compact octahedron projection layout with padding according to an embodiment of the present invention. FIG. 18 is a diagram illustrating a compact cubemap projection layout with padding according to an embodiment of the present invention. The padding regions packed in the projection layout 1502/1602/1702/1802 may be generated by the aforementioned geometry padding manner that applies geometry padding to a projection face to determine pixel values of pixels included in a padding region connected with the projection face, or may be generated by the aforementioned duplication manner which sets pixel values of pixels included in a padding region connected with a projection face by duplicating pixel values of boundary pixels of the projection face, or by duplicating pixel values of pixels that are included in the projection face but do not connect with the padding region, or by duplicating pixel values of pixels that are not included in the projection face.

It should be noted that the aforementioned layout examples are for illustrative purposes only, and are not meant to be limitations of the present invention. In other embodiments of the present invention, a 360 VR projection layout with padding may be obtained by adding padding regions to a layout of other projection format, such as a pyramid projection layout, a tetrahedron projection layout, a tetragon quartz-based projection layout, an icosahedron projection layout, or a hexagon quartz-based projection layout.

With the help of padding regions added to boundaries of a projection layout, the image quality of boundaries after compression can be improved. As mentioned above, the graphic rendering circuit 124 renders and displays an output image data on the display screen 126 according to the decoded frame IMG'. Since the padding regions in the decoded frame IMG' are additionally added and may not be displayable, the padding regions in the decoded frame IMG' may be discarded/ignored by the graphic rendering circuit 124 after the decoded frame IMG' is generated from the decoding circuit 122.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method comprising:
   receiving an omnidirectional content corresponding to a sphere;
   obtaining a plurality of projection faces of a three-dimensional object from the omnidirectional content of the sphere, wherein the omnidirectional content of the sphere is mapped onto the projection faces via a 360-degree Virtual Reality (360 VR) projection; and
   creating, by a conversion circuit, a projection-based frame by generating at least one padding region and packing the projection faces and said at least one padding region in a 360 VR projection layout, wherein the projection faces comprise a first projection face and a second projection face, where regarding the three-dimensional object, one side of the first projection face does not connect with one side of the second projection face; said at least one padding region packed in the 360 VR projection layout comprises a first padding region, where regarding the 360 VR projection layout, said one side of the first projection face is parallel with said one side of the second projection face, and the first padding region is sandwiched between the first projection face and the second projection face and connects with said one side of the first projection face and said one side of the second projection face for isolating said one side of the first projection face from said one side of the second projection face in the 360 VR projection layout.

2. The video processing method of claim 1, wherein generating said at least one padding region comprises:
   setting pixel values of pixels included in the first padding region by interpolation that is based on pixel values of pixels included in the first projection face and the second projection face.

3. The video processing method of claim 1, wherein generating said at least one padding region comprises:
   applying first geometry padding to the first projection face to determine first pixel values of pixels included in the first padding region;
   applying second geometry padding to the second projection face to determine second pixel values of the pixels included in the first padding region; and setting pixel values of the pixels included in the first padding region by blending the first pixel values derived from the first geometry padding and the second pixel values derived from the second geometry padding.

4. The video processing method of claim 1, wherein generating said at least one padding region comprises:
setting pixel values of pixels included in the first padding region by duplicating pixel values of pixels included in the first projection face and the second projection face.

5. The video processing method of claim 1, wherein the projection faces packed in the 360 VR projection layout further comprise at least one projection face distinct from the first projection face and the second projection face, and generating said at least one padding region comprises:
setting pixel values of pixels included in the first padding region by duplicating pixel values of pixels included in said at least one projection face.

6. The video processing method of claim 1, further comprising:
encoding the projection-based frame with the projection faces and said at least one padding region packed in the 360 VR projection layout to generate a part of a bitstream.

7. The video processing method of claim 1, wherein the 360 VR projection is an octahedron projection, the 360 VR projection layout is an octahedron projection layout, the projection faces are triangular projection faces, and an equator of the sphere is not mapped along any side of each of the triangular projection faces.

8. The video processing method of claim 7, wherein the projection faces packed in the 360 VR projection layout further comprise a third projection face, a fourth projection face, a fifth projection face and a sixth projection face, where there is an image content discontinuity edge between another side of the first projection face and one side of the third projection face if said another side of the first projection face connects with said one side of the third projection face, there is an image content discontinuity edge between one side of the fourth projection face and one side of the fifth projection face if said one side of the fourth projection face connects with said one side of the fifth projection face, and there is an image content discontinuity edge between another side of the fourth projection face and one side of the sixth projection face if said another side of the fourth projection face connects with said one side of the sixth projection face; said at least one padding region packed in the 360 VR projection layout further comprises a second padding region, a third padding region and a fourth padding region, where the second padding region connects with said another side of the first projection face and said one side of the third projection face for isolating said another side of the first projection face from said one side of the third projection face in the 360 VR projection layout, the third padding region connects with said one side of the fourth projection face and said one side of the fifth projection face for isolating said one side of the fourth projection face from said one side of the fifth projection face in the 360 VR projection layout, and the fourth padding region connects with said another side of the fourth projection face and said one side of the sixth projection face for isolating said another side of the fourth projection face from said one side of the sixth projection face in the 360 VR projection layout.

9. The video processing method of claim 8, wherein a shape of the 360 VR projection layout is a rectangle; the projection faces packed in the 360 VR projection layout further comprise a seventh projection face and an eighth projection face; the first projection face is split into a first right-triangle-shaped part and a second right-triangle-shaped part, the first right-triangle-shaped part has a first side being said one side of the first projection face and a second side being a first part of yet another side of the first projection face, the second right-triangle-shaped part has a first side being said another side of the first triangular face and a second side being a second part of said yet another side of the first triangular projection face; the fourth projection face is split into a third right-triangle-shaped part and a fourth right-triangle-shaped part, the third right-triangle-shaped part has a first side being said one side of the fourth projection face and a second side being a first part of yet another side of the fourth projection face, the fourth right-triangle-shaped part has a first side being said another side of the fourth triangular face and a second side being a second part of said yet another side of the fourth triangular projection face; the first padding region connects with the first side of the first right-triangle-shaped part and the said one side of the second projection face; another side of the second projection face connects with one side of the seventh projection face, where there is an image content continuity boundary between said another side of the second projection face and said one side of the seventh projection face; another side of the seventh projection face connects with another side of the third projection face, where there is an image content continuity boundary between said another side of the seventh projection face and said another side of the third projection face; the second padding region connects with the first side of the second right-triangle-shaped part and said one side of the third projection face; the third padding region connects with the first side of the third right-triangle-shaped part and said one side of the fifth projection face; another side of the fifth projection face connects with one side of the eighth projection face, where there is an image content continuity boundary between said another side of the fifth projection face and said one side of the eighth projection face; another side of the eighth projection face connects with another side of the sixth projection face, where there is an image content continuity boundary between said another side of the eighth projection face and said another side of the sixth projection face; and the fourth padding region connects with the first side of the fourth right-triangle-shaped part and said one side of the sixth projection face.

10. The video processing method of claim 9, wherein the equator of the sphere is mapped to the first projection face, the fourth projection face, the seventh projection face, and the eighth projection face.

11. A video processing method comprising:
receiving an omnidirectional content corresponding to a sphere;
obtaining at least one projection face from the omnidirectional content of the sphere, wherein the omnidirectional content of the sphere is mapped onto said at least one projection face via a 360-degree Virtual Reality (360 VR) projection;
creating, by a conversion circuit, a projection-based frame by generating at least one padding region and packing said at least one projection face and said at least one padding region in a 360 VR projection layout, wherein said at least one projection face packed in the 360 VR projection layout comprises a first projection face; said at least one padding region packed in the 360 VR projection layout comprises a first padding region; the first padding region connects with the first projection face, and forms at least a portion of one boundary of the 360 VR projection layout; and encoding the projection-based frame with said at least one projection face and said at least one padding region packed in the 360 VR projection layout to generate a part of a bitstream, wherein said at least one padding region is decoded from the part of the bitstream at a decoding circuit.

12. The video processing method of claim 11, wherein generating said at least one padding region comprises:
applying geometry padding to the first projection face to determine pixel values of pixels included in the first padding region.

13. The video processing method of claim 11, wherein generating said at least one padding region comprises:
setting pixel values of pixels included in the first padding region by duplicating pixel values of specific pixels included in the first projection face that connects with the first padding region in the 360 VR projection layout.

14. The video processing method of claim 13, wherein the first padding region connects with one side of the first projection face, and the specific pixels comprise boundary pixels at said one side of the first projection face.

15. The video processing method of claim 14, wherein the 360 VR projection is one of an equirectangular projection (ERP) and an equal-area projection (EAP), the first projection face comprises a partial region, the partial region comprises the boundary pixels at said one side of the first projection face, the first padding region is generated by duplicating the partial region to obtain a duplicated partial region and flipping the duplicated partial region, and there is an image content continuity boundary between the first padding region and the first projection face packed in the 360 VR projection layout.

16. The video processing method of claim 14, wherein the 360 VR projection is one of an equirectangular projection (ERP) and an equal-area projection (EAP), the first projection face comprises a partial region, the partial region comprises the boundary pixels at said one side of the first projection face, the first padding region is generated by duplicating the partial region to obtain a duplicated partial region and rotating the duplicated partial region, and there is an image content continuity boundary between the first padding region and the first projection face packed in the 360 VR projection layout.

17. The video processing method of claim 13, wherein the first padding region connects with one side of the first projection face, and the specific pixels do not comprise boundary pixels at said one side of the first projection face.

18. The video processing method of claim 17, wherein the 360 VR projection is one of an equirectangular projection (ERP) and an equal-area projection (EAP), the first padding region do not connect with another side of the first projection face, said one side of the first projection face and said another side of the first projection face are opposite sides of the first projection face, the first projection face comprises a partial region, the partial region comprises boundary pixels at said another side of the first projection face, the first padding region is generated by duplicating the partial region, and there is an image content continuity boundary between the first padding region and the first projection face packed in the 360 VR projection layout.

19. A video processing method comprising:
receiving a part of a bitstream; and
decoding, by a decoding circuit, the part of the bitstream to generate a decoded frame, wherein the decoded frame is a projection-based frame that has projection faces of a three-dimensional object and at least one padding region packed in a 360-degree Virtual Reality (360 VR) projection layout, the projection faces comprise a first projection face and a second projection face, where regarding the three-dimensional object, one side of the first projection face does not connect with one side of the second projection face; said at least one padding region packed in the 360 VR projection layout comprises a first padding region, where regarding the 360 VR projection layout, said one side of the first projection face is parallel with said one side of the second projection face, and the first padding region is sandwiched between the first projection face and the second projection face and connects with said one side of the first projection face and said one side of the second projection face for isolating said one side of the first projection face from said one side of the second projection face in the 360 VR projection layout.

20. A video processing method comprising:
receiving a part of a bitstream; and
decoding, by a decoding circuit, the part of the bitstream to generate a decoded frame, wherein at least one padding region is decoded from the part of the bitstream at the decoding circuit, the decoded frame is a projection-based frame that has at least one projection face and said at least one padding region packed in a 360-degree Virtual Reality (360 VR) projection layout, said at least one projection face packed in the 360 VR projection layout comprises a first projection face; said at least one padding region packed in the 360 VR projection layout comprises a first padding region; the first padding region connects with the first projection face, and forms at least one boundary of the 360 VR projection layout.

* * * * *